Sept. 25, 1956  A. F. ANJESKEY  2,764,298
APPARATUS FOR HANDLING COILED MATERIAL
Filed March 31, 1951  9 Sheets-Sheet 1

INVENTOR.
ALPHONSE F. ANJESKEY
BY Hudson, Broughton,
Williams, David & Hoffmann
ATTORNEYS Sept. 25, 1956   A. F. ANJESKEY   2,764,298
APPARATUS FOR HANDLING COILED MATERIAL
Filed March 31, 1951   9 Sheets-Sheet 2

INVENTOR.
ALPHONSE F. ANJESKEY
BY Hudson, Boughton,
Williams, David & Hoffmann
ATTORNEYS

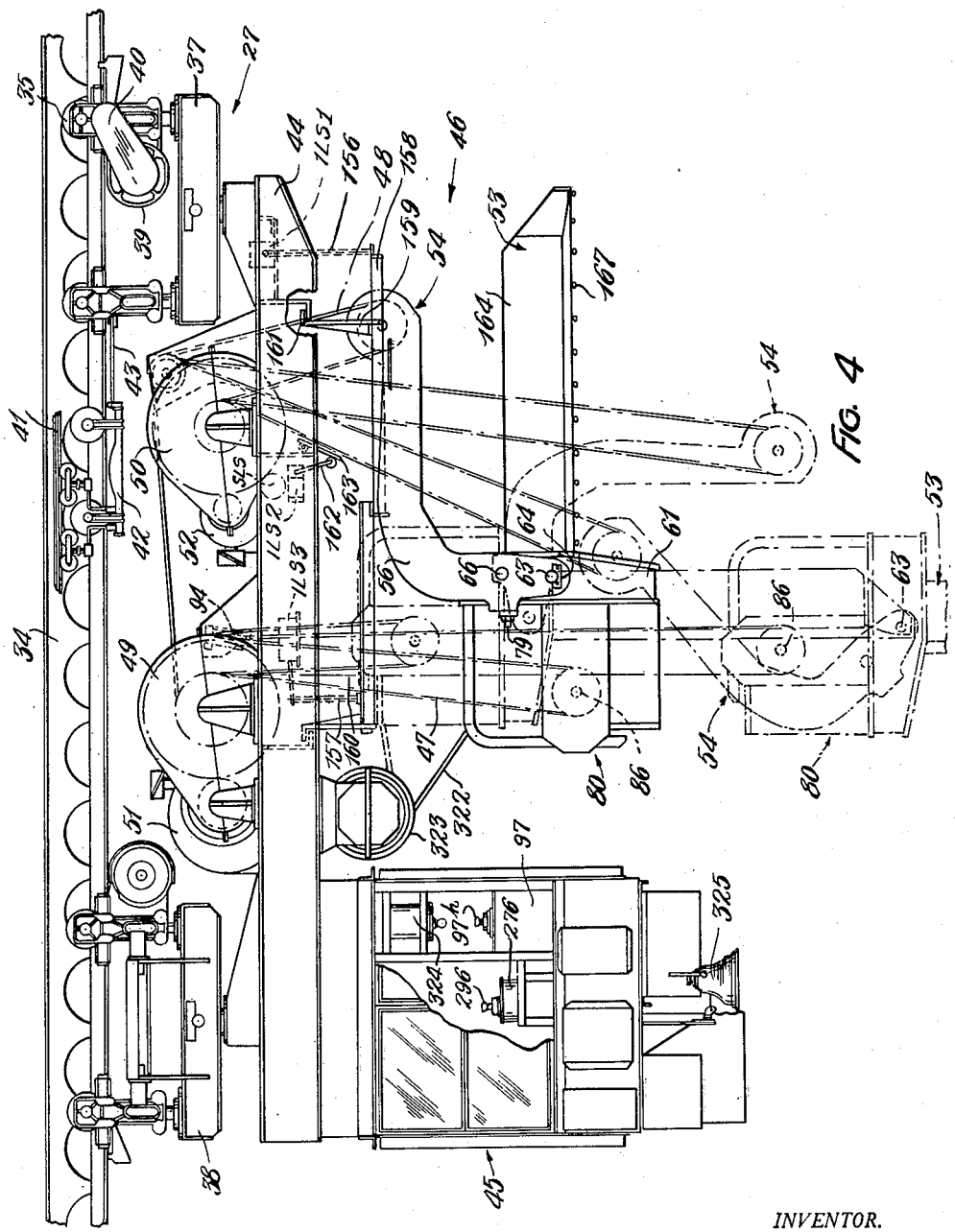

INVENTOR.
ALPHONSE F. ANJESKEY
BY Hudson, Boughton,
Williams, David & Hoffmann.
ATTORNEYS

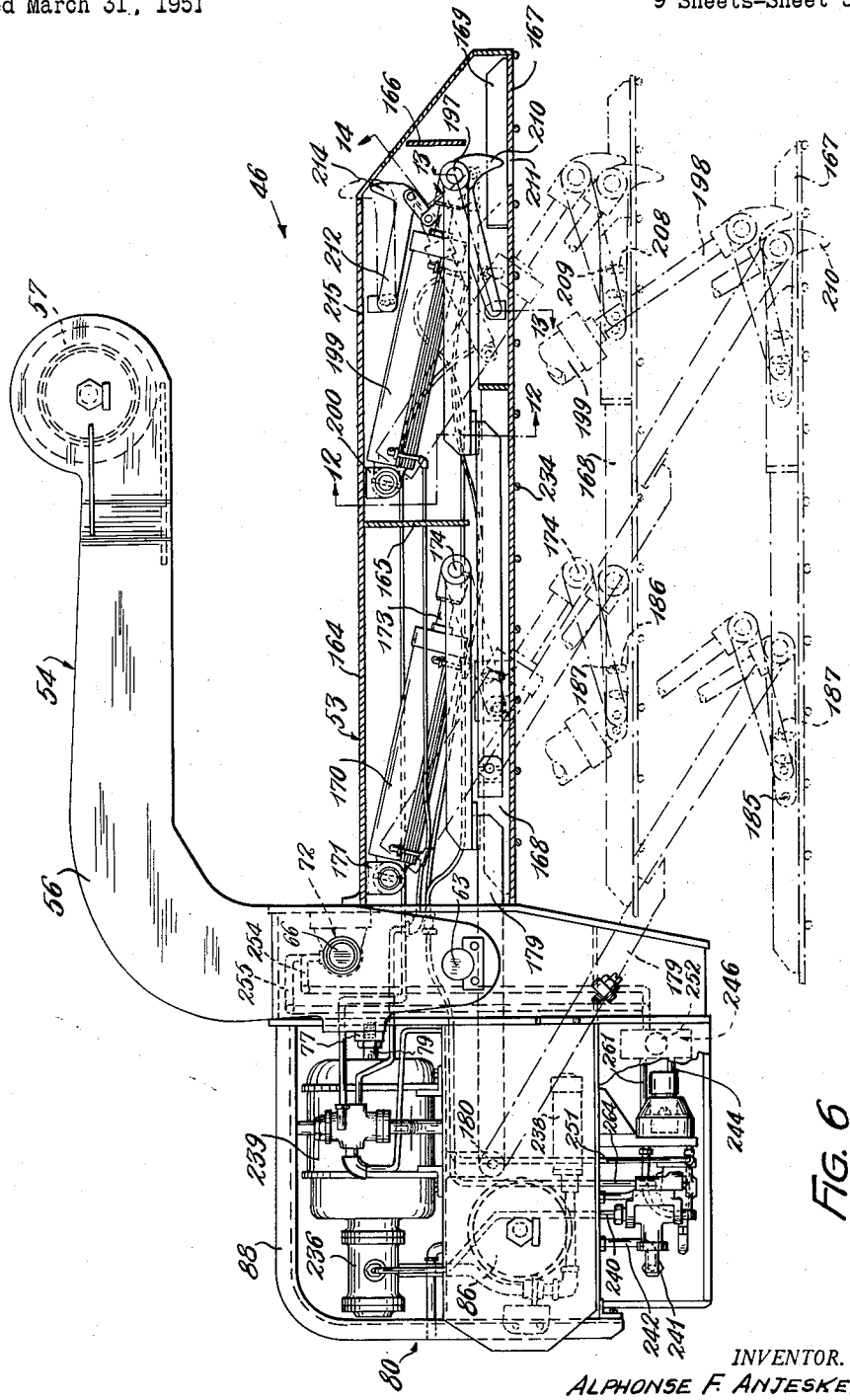

Sept. 25, 1956  A. F. ANJESKEY  2,764,298
APPARATUS FOR HANDLING COILED MATERIAL
Filed March 31, 1951  9 Sheets-Sheet 6
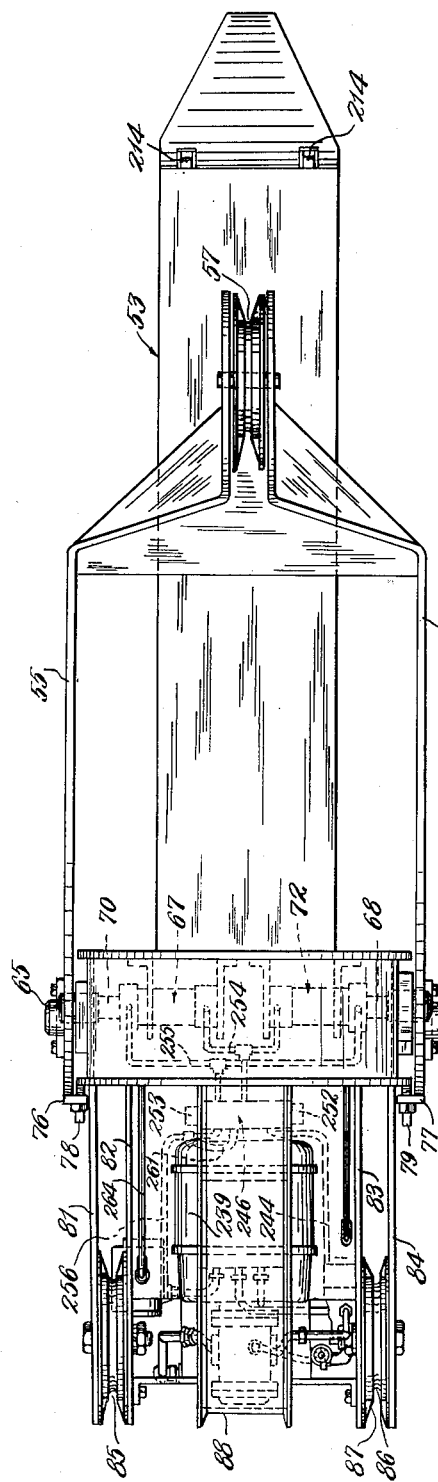
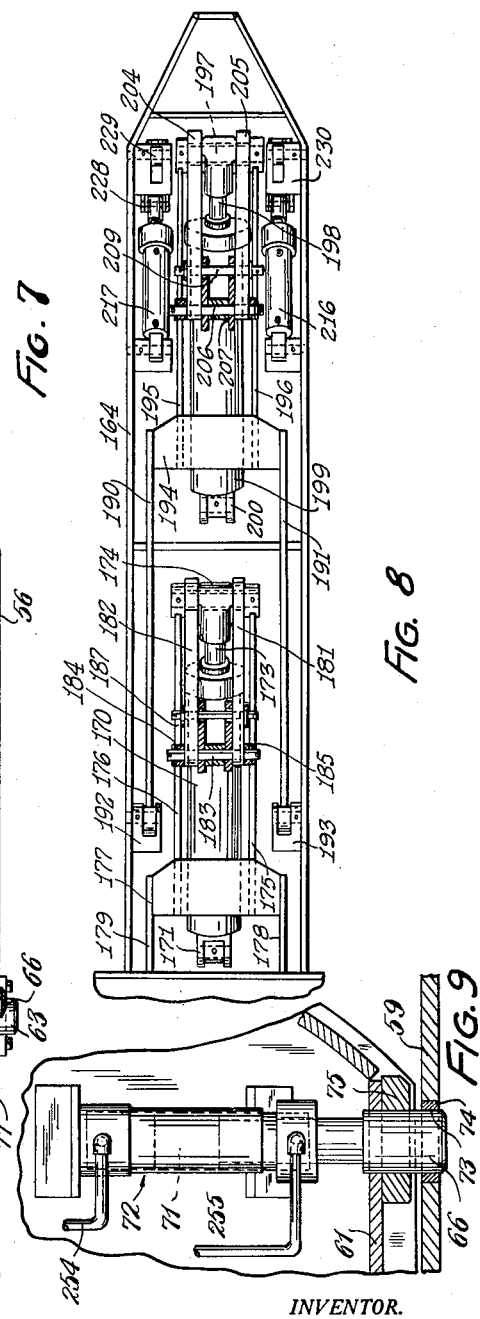
INVENTOR.
ALPHONSE F. ANJESKEY
BY Hudson, Boughton,
Williams, David & Hoffmann
ATTORNEYS Sept. 25, 1956 A. F. ANJESKEY 2,764,298
APPARATUS FOR HANDLING COILED MATERIAL
Filed March 31, 1951 9 Sheets-Sheet 7

INVENTOR.
ALPHONSE F. ANJESKEY
BY Hudson, Boughton,
Williams, David & Hoffmann
ATTORNEYS

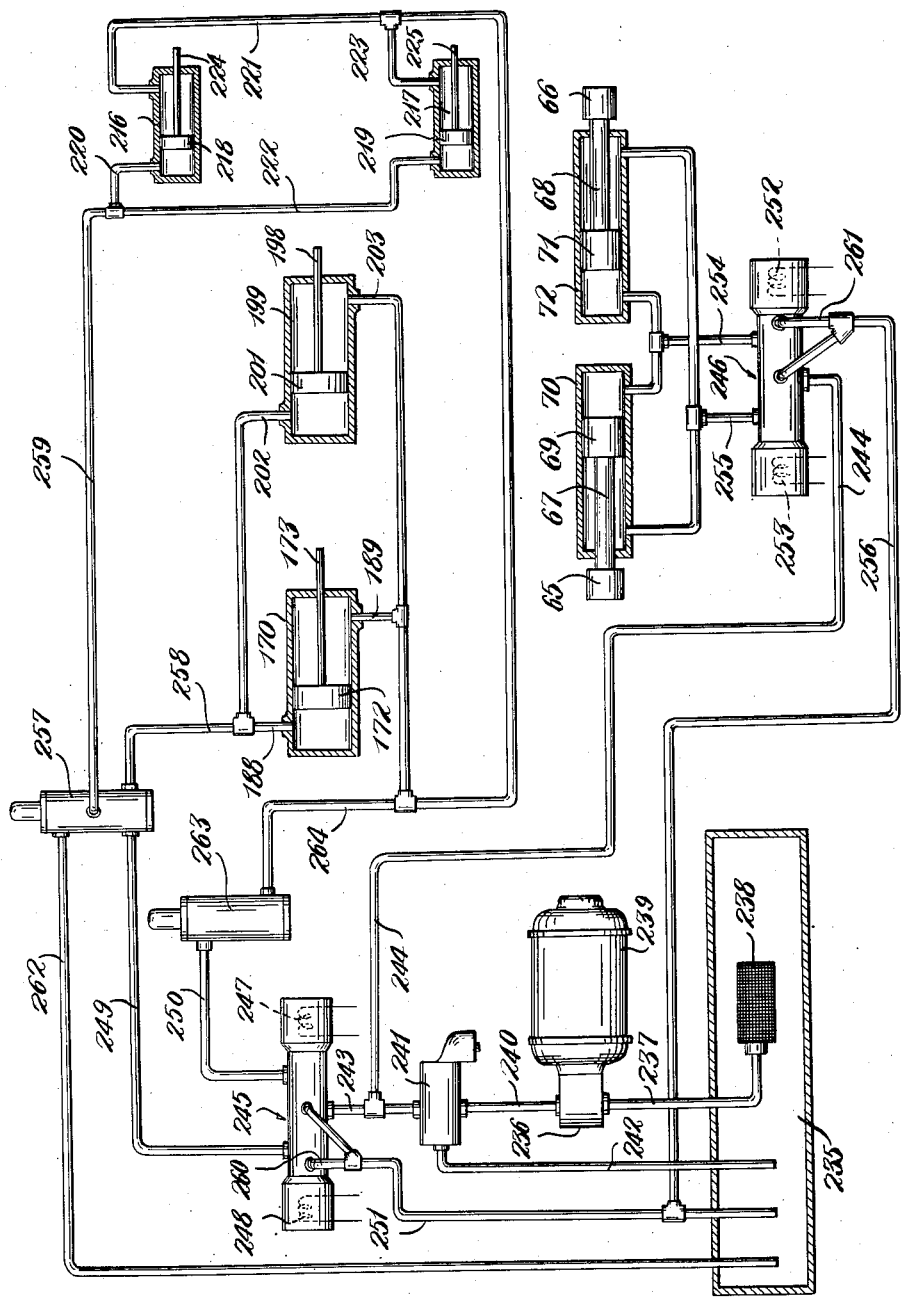

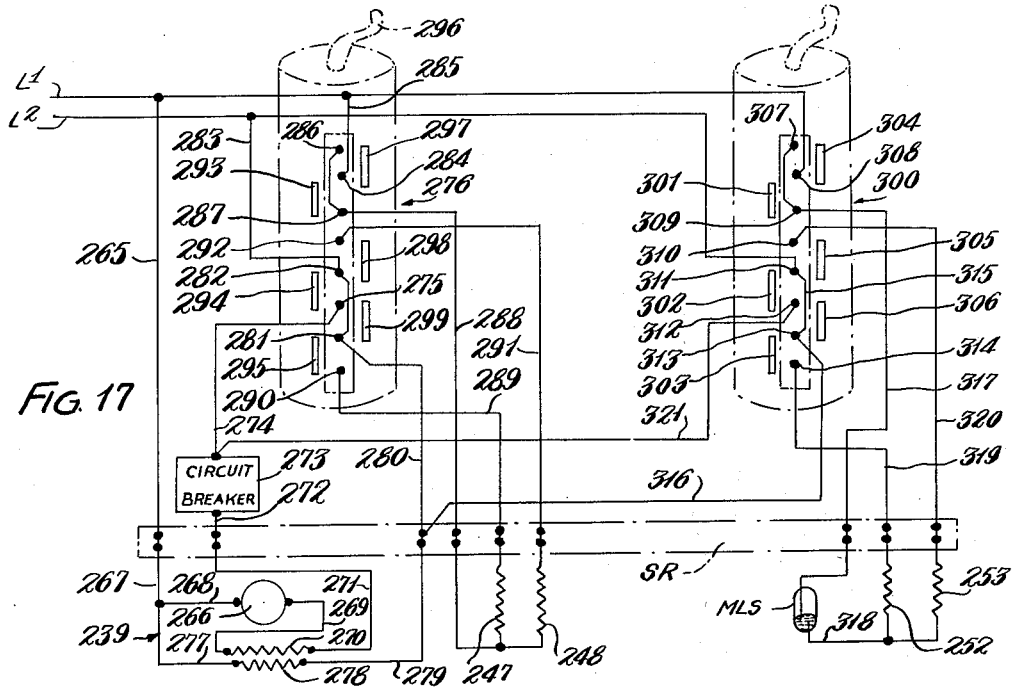

United States Patent Office 2,764,298
Patented Sept. 25, 1956

2,764,298

APPARATUS FOR HANDLING COILED MATERIAL

Alphonse F. Anjeskey, Cleveland, Ohio, assignor to The Cleveland Crane & Engineering Company, Wickliffe, Ohio, a corporation of Ohio Application March 31, 1951, Serial No. 218,676

9 Claims. (Cl. 212—127)

This invention relates to a means for handling material in tubular or annular form with central apertures therethrough and, more particularly, to an apparatus of the overhead carrier type adapted for handling material such as coils of wire, rod, metal, and the like.

The storage and handling of various annular bodies present similar problems and, while this invention is susceptible of utilization with a wide variety of annular bodies, it is especially adapted to the handling and storing of coils of wire, rod, and the like, and therefore the subsequent description will, for simplicity, be confined largely to the storing and handling of such material. It is to be understood, however, that this restriction of the description to use of the invention with coiled material is simply to facilitate the disclosure and is not to be considered as a limitation of the invention.

Heretofore, coiled material, such as coils of wire, rod, and the like, has customarily been stored with the axes of the individual coils in a susbtantially horizontal position and, in order to conserve space, it has been necessary that the coils be more than one layer high. When stored in this manner, the weight of the coils in the upper layer or layers tends to deform the coils therebelow, and when the warehouse or storage area contains coils of different dimensions or of different analyses, the selectivity is very poor, since the coil or coils having the characteristics desired at a particular time may be at the bottom with four or five layers of other coils on top so that it is necessary to move a very considerable tonnage of material to reach the coil or coils desired. Furthermore, when coiled material is stored in the manner referred to, there is danger of the coils rolling for sliding unless framework is provided for retaining the coils in position. Such framework is relatively costly, since it must be quite strong and requires considerable fabrication and, in addition, it reduces the tonnage of coiled material that can be stored in any given storage area without decreasing the selectivity of the storage.

Another disadvantage of the prior method of storing coiled material, in the manner mentioned above, is that much of the storage space cannot be utilized due to the necessity for leaving clearance at the ends of the rows of stored coils to permit use of conventional coil handling equipment, such as the hook disclosed in the Bennington Patent No. 1,546,364. This is due to the fact that, while such a hook may be tilted to facilitate its entrance into, or its withdrawal from, the coils the hook must be left substantially horizontal when lifting, lowering, or transporting the coils to prevent the latter from sliding from the hook so that a clear space, equal to or greater than the length of the hook, must be left at the end of each row of coils.

An improved method and apparatus for storing and handling annular bodies having central openings, such as coiled wire, rod, and the like, is disclosed and claimed in my copending Patent 2,696,920. As disclosed therein, the bodies or coils are stored with their axes extending substantially vertically and are placed in and removed from storage by material handling means movable over the storage area and adapted to be inserted into or withdrawn from the material in a susbtantially vertical position. The material handling means comprises a substantially U-shaped, hook-like member supported for horizontal and vertical movement and for tilting movement, the lower leg of said member being adapted to be inserted through central openings of the annular bodies or coils to be handled and expanded into contact with the side walls of such openings to thereby retain the bodies upon said handling member regardless of the position of the latter.

The principal object of this invention is to provide an improved material handling apparatus having a substantially U-shaped member of the type mentioned above in which the relative positions of the two legs of the member may be altered so that annular bodies or coils may readily be handled to and from storage in piles with their axes extending vertically and with less unused space between adjacent piles thereby making possible a more efficient utilization of storage areas.

Another object of the invention is to provide an improved material handling apparatus having a substantially U-shaped member of the type mentioned in which the lower and upper legs are hingedly connected and adapted to move out of the U-shaped configuration thus reducing the maximum lateral dimension of the member thereby facilitating insertion of the lower leg thereof into the central openings of the coils or other bodies without interference between the upper leg of the member and coils or supports for coils which are closely adjacent the coils being handled.

A further object of the invention is to provide an improved handling apparatus for annular bodies, coils or the like, adapted to be moved from place to place above a storage area and including a substantially U-shaped member adapted to be raised, lowered or tilted with respect to that area, the said member having the lower and upper legs hinged together and adapted to swing relative to each other to a position in which the said legs are no longer in parallel relationship, a hydraulically operated locking means being provided to selectively permit or prevent such swinging movement, the lower leg of the member being expansible in any position thereof for engagement with and retention thereon of the annular bodies or coils.

The invention further resides in certain features of construction, and combination and arrangement of parts, and further objects and advantages of the invention will be apparent to those skilled in the art to which it pertains from the following description of the present preferred embodiment thereof described with reference to the accompanying drawings, in which similar reference characters represent corresponding parts in the several views, and in which:

Fig. 4 is an enlarged side elevational view of the novel material handling apparatus shown in Fig. 1 illustrating the manner in which it is supported for overhead movement, the inverted or vertical positions of the material handling member or hook with the legs parallel and with the legs swung out of parallelism being indicated in broken lines;

Figure 12:
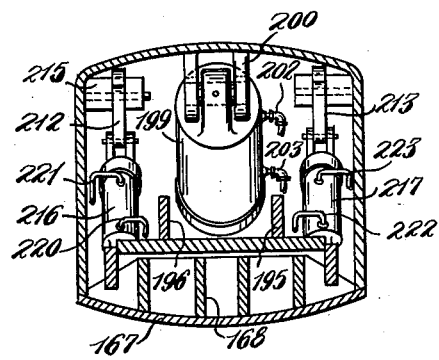
Figure 13:
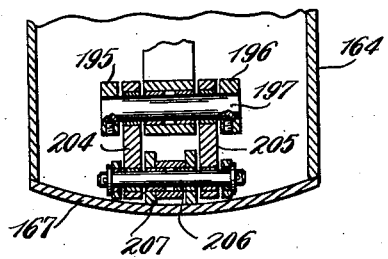
Figure 14:
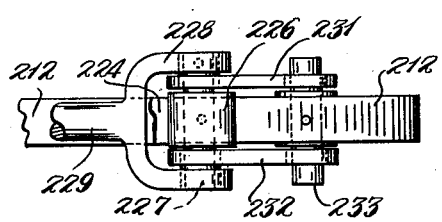
Figure 5:
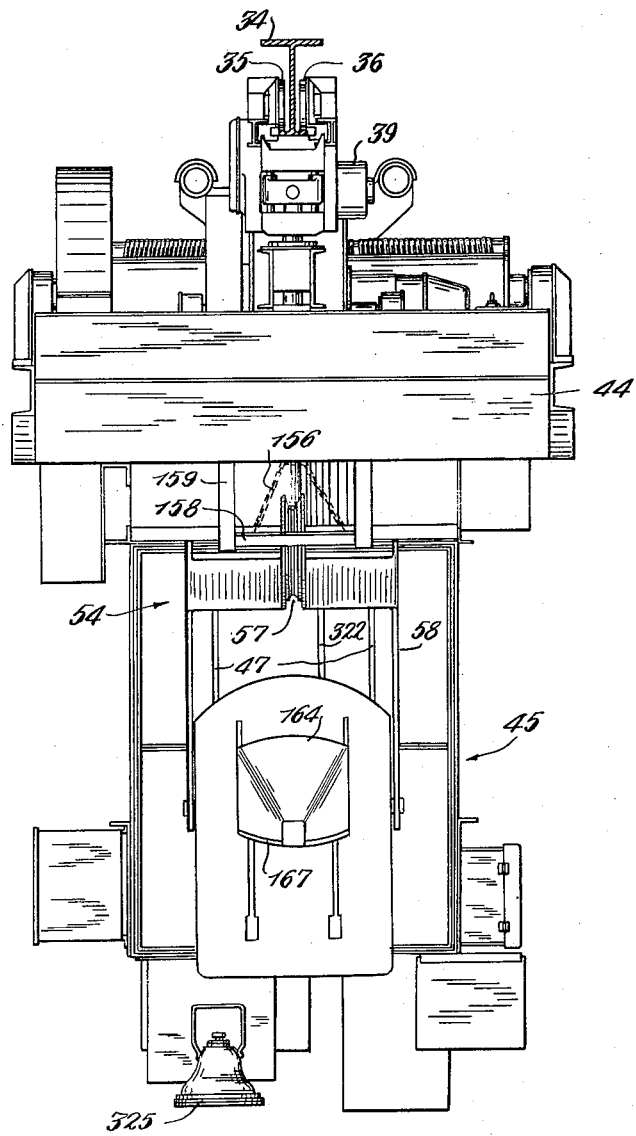
Fig. 5 is a front view of the apparatus shown in Fig. 4.
Figure 10:
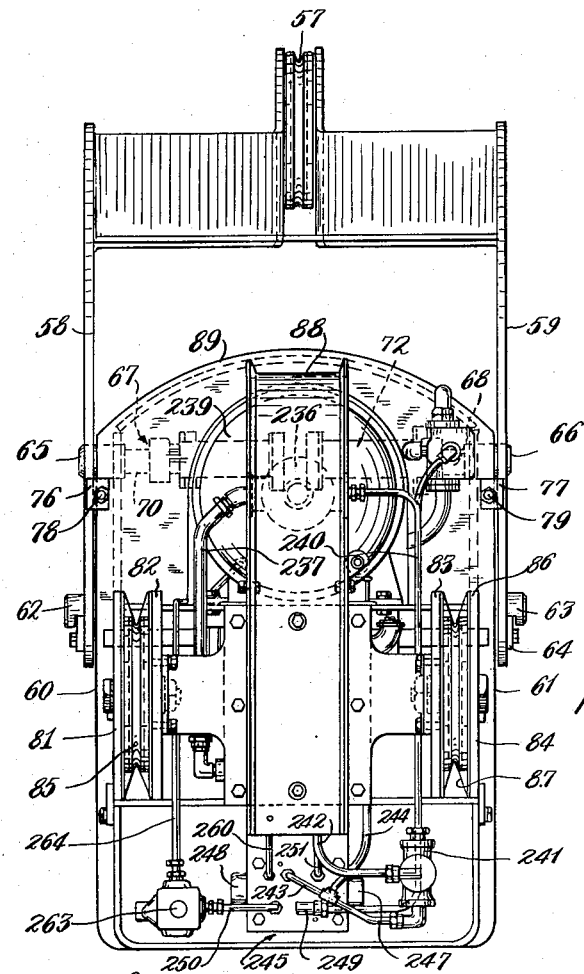
Figure 11:
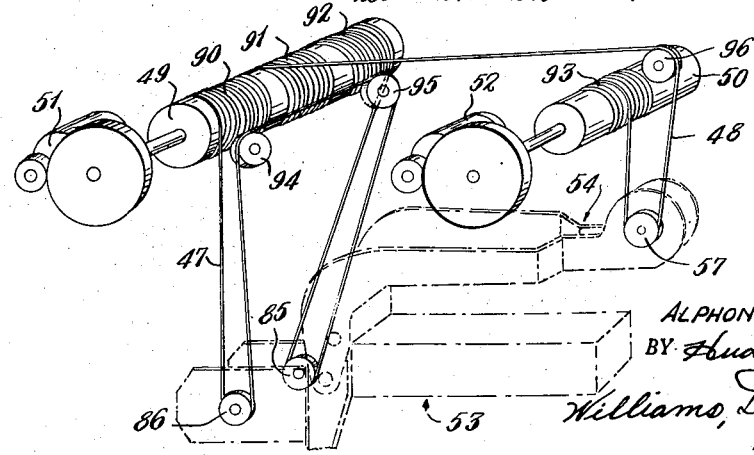

Fig. 6 is an enlarged detached view of that portion of the material handling apparatus herein referred to as the "hook" with certain parts broken away and others shown in section to more clearly illustrate the mechanism for expanding a portion of the hook and for operating the finger members provided thereon for preventing displacement of annular bodies carried on the hook, the movable portions of the expanding leg of the hook being shown in dot-dash lines in two different positions representing their respective positions for cooperation with annular bodies of different internal diameters;

Fig. 7 is a top plan view of the apparatus shown in Fig. 6 with certain of the valves and pipes of the hydraulic system for operating the hook omitted;

Fig. 8 is a fragmentary bottom view of the apparatus shown in Fig. 7 with the lower or movable plate or member of the lower leg and the pipes for the operating cylinders removed and with certain parts shown in section, the view illustrating the relationship of the parts of the actuating mechanism for effecting movement of said lower plate;

Fig. 9 is an enlarged fragmentary view, partly in section and partly in plan, illustrating one of the latching or locking means for securing the two legs of the hook together;

Fig. 10 is an end view of the hook as seen from the left-hand side of Figs. 6 and 7;

Fig. 11 is a detached perspective, somewhat schematic, view of the reeving of the cables for operating the hook, a portion of the latter being indicated in broken lines to show its relationship with the cables and the various sheaves therefor;

Fig. 12 is a sectional view taken substantially on the line 12—12 of Fig. 6 and looking in the direction indicated by the arrows;

Fig. 13 is a fragmentary sectional view taken substantially on the line 13—13 of Fig. 6 and looking in the direction indicated by the arrows;

Fig. 14 is a fragmentary sectional view taken substantially on the line 14—14 of Fig. 6 and looking in the direction indicated by the arrows so that the interconnected parts appear in substantially their "opened-out" or operated positions;

Fig. 15 is a simplified schematic representation of the hydraulic system for operating the movable parts of the hook;

Fig. 16 is a simplified schematic wiring diagram illustrating the manner in which the limit switches control the operation of the hoist motors to prevent elevating the hook above a predetermined height, and/or excessive tilting; and, Fig. 17 is a simplified schematic wiring diagram of the control circuit for actuating the hydraulic system of the hook.

Figure 1:
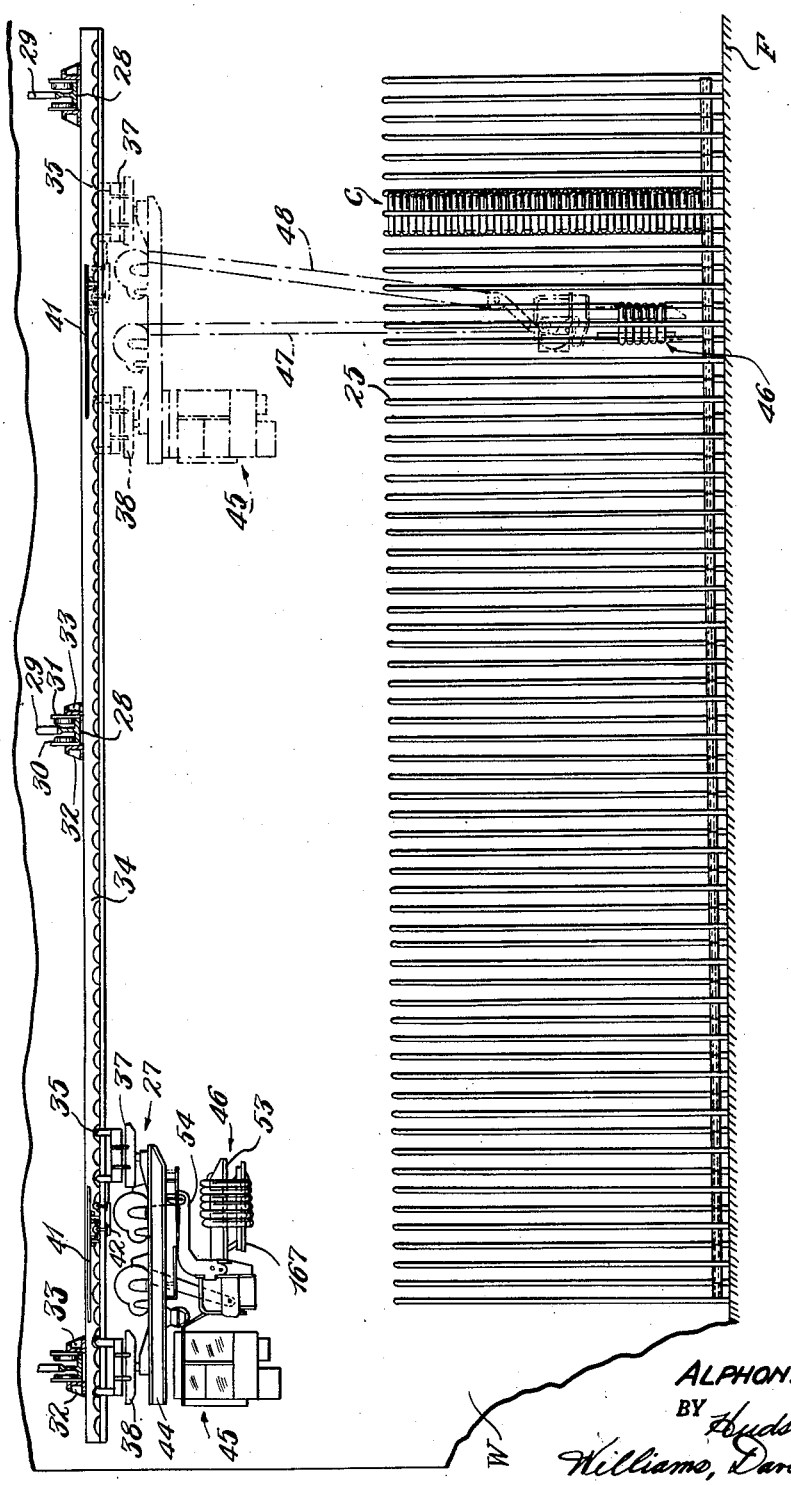
Fig. 1 is a sectional view through a warehouse for storing annular bodies, such as coils of wire or the like, and illustrating the novel material handling apparatus in full lines in its material transporting position and in dot-dash lines in its position for depositing and/or removing annular bodies from storage.
Figure 2:
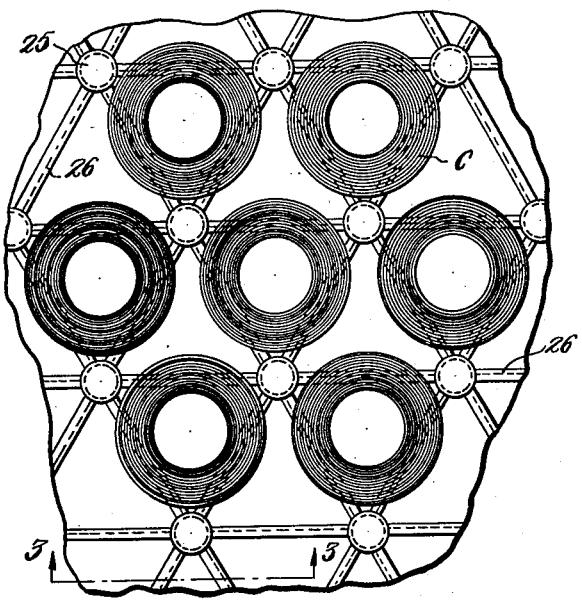
Fig. 2 is a top plan view of a portion of the annular body or coil supporting structure or framework shown in Fig. 1 with annular bodies, such as coils of wire, supported thereon.
Figure 3:
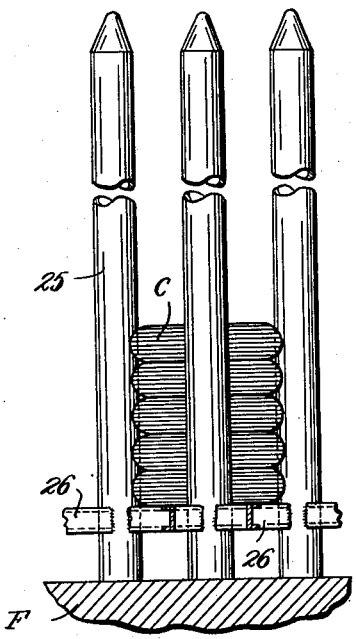
Fig. 3 is a fragmentary view, partly in side elevation and partly in section, of a portion of the framework for supporting the annular bodies or coils, the view being taken on the line 3—3 of Fig. 2.

Referring first to Figs. 1 through 3 of the drawings, it will be seen that annular bodies, such as coils C of wire, rod, or the like, are arranged in vertical piles within a storage area or warehouse W, the axes of the coils in any one pile extending in substantial vertical alignment so that the central openings therethrough are substantially aligned. The coils in any given vertical pile are preferably all of the same characteristics, that is to say, they have the same chemical and physical characteristics and are substantially of the same size, the piles being arranged in a symmetrical pattern or patterns, as will be apparent from Fig. 2, so as to leave a minimum of waste space therebetween. Lateral displacement of the coils in any pile is prevented by vertically extending, elongated, rigid members 25, which are located in the interstices between the respective piles and held from lateral movement as is hereinafter more fully described.

In one type of suitable supporting framework for the annular bodies or coils C, the elongated members 25 may be formed of steel pipes or the like provided with conical caps. These members 25 are arranged in vertically extending symmetrical order so as to form the corners of regular polygons and are joined together, adjacent their bases, by horizontally extending members 26. These horizontal members 26 may be formed of suitable structural steel members such as I beams, channel members, or the like, and are preferably secured to the vertical members or pipes 25 by welding. It will be observed that these members 26 constitute sides for the polygon of which the vertical members 25 form corners and the greatest transverse dimension of the polygons, as measured to the inside edges of the members 26, is preferably less than the outside diameter of the bodies or coils C to be supported thereby, while the least transverse dimension across said polygons is equal to or greater than the central openings through the bodies or coils C. The upper surfaces of the several members 26 preferably lie in a substantially horizontal plane and preferably are the sole means interconnecting the pipes or vertical members 25, the lower ends of which may simply rest upon the floor F of the storage area or warehouse W without the necessity of being secured thereto.

In addition to securing the vertical members 25 together, the horizontal members 26 perform the additional function of supporting the lowermost body or coil C in each of the several piles in positions elevated above floor F of the storage area. This enables the outer end of a leg of the handling mechanism to extend below the lowermost body or coil C a sufficient distance so that laterally extendable projections may be engaged below, and be retracted from beneath, the said lowermost body or coil, thus facilitating placing the coils or bodies in storage and withdrawing them therefrom.

The novel material handling device 27 is incorporated in a monorail carrier supported for overhead movement by an overhead monorail track system comprising a monorail crane bridge supported by, and movable along, a runway comprising a plurality of spaced parallel rails 28 suspended by suitable hangers 29 from the roof truss supports, not show, of the warehouse or storage area W. The rails 28 are of conventional construction and have parallel track surfaces on either sides of central vertical webs which track surfaces support flanged wheels 30 and 31. The wheels 30 and 31 are rotatably mounted on suitable bracket members 32 and 33 which in turn support the crane bridge or girder formed of a substantially I-beam shaped member 34. This member or rail 34 is formed substantially like the rails 28 and has upper track surfaces on either side of a vertically extending central web on which surfaces roll or travel flanged wheels, such as 35 and 36, connected to carrier members 37 and 38. It will be observed that the rails 28 extend at right angles with respect to the member or rail 34 and, since the latter is movable along the former, while the carrier members 37 and 38 which support the carrier proper are movable along the rail 34, the carrier may be horizontally moved to any position above the storage area.

The parts just mentioned are of the conventional construction employed in transfer bridges, overhead cranes or the like, and hence the details thereof need not be described. Suffice it to note that the rail 34 may be moved by suitable means, such as motor driven mechanism associated with one or more of the wheels 30, 31 while the carrier is driven by independent motors 39 carried by the carrier members 37, 38 and connected to the wheels 35, 36 through suitable gear trains within the housing 40, see Fig. 4. Power for operating the motors 39 and other parts of the apparatus hereinafter described is obtained from two overhead conductors 41, one on either side of the rail 34, by a suitable trolley member in the form of a small carrier 42 running upon the rail 34. The trolley member 42 includes current collector wheels in engagement with the conductors 41 and is connected with one of the carrier members, such as 37, by a flexible connection 43 so that any vibration, swaying movement or the like, of the carrier proper is not transmitted to the trolley member 42 thereby insuring satisfactory electrical contact with the conductor members 41 at all times.

The members 37 and 38 of the carrier are interconnected by a suitable supporting frame 44 from one end of which is suspended an operator's cab 45. The material handling hook 46 is movably suspended from the member 44 forwardly of the cab 45, that is, to the right as shown in Figs. 1 and 4, by cables 47 and 48. The cables are connected to a pair of spaced cable drums or reels 49 and 50 which are rotatably supported upon the member 44 and driven by separate drive motors 51 and 52, respectively, through suitable gearing. The manner in which the cables 47, 48 are connected with the drums and reeved about pulleys upon the hook 46 is hereinafter described.

The material handling member or hook 46 is normally substantially U-shaped and comprises two elongated members or legs, a lower expanding leg 53 and an upper nonexpanding leg 54, the two legs being hingedly connected together as hereinafter explained for swinging or pivoting movement of one relative to the other. The upper leg 54 is constructed of suitable plates and/or structural members, such as 55, 56, see Fig. 7, connected together in spaced relationship. Adjacent the forward end of the upper leg 54, the plates or members 55, 56 are disposed closely adjacent each other in parallel relationship providing bearings for a pulley or sheave 57 which is rotatably supported therebetween and receives the previously-mentioned cable 48. The members 55 and 56, at the rear ends thereof, are connected to or integral with portions 58 and 59 which extend transversely therefrom and are disposed vertically when the hook is horizontal. Received between the portions 58, 59 of the upper leg of the hook are similarly disposed spaced plates 60 and 61 which are integral with or rigidly connected to the lower leg 53 adjacent the rear end thereof and extend upwardly therefrom when the hook is horizontal.

As mentioned heretofore, the upper and lower legs of the material handling member or hook 46 are hinged together. For this purpose the adjacent parts of the plates 58 and 60 overlap and are rockably connected by a pivot pin 62. Likewise, the plates 59 and 61 overlap and are rockably connected by a pivot pin 63, see Fig. 10. The axes of these pivot pins are in alignment and each pin is held from displacement relative to the plates through which it passes by means of a retainer plate such as 64 welded or bolted to the adjacent plate of the hook member and having its edge positioned in a transverse slot in the adjacent pivot pin.

The lower leg 53 of the hook is selectively secured or latched to the upper leg 54 in the aforemenioned U-shaped relationship or freed for pivoting or rocking movement with respect thereto by means of latching or locking members or pins 65 and 66. In the illustrated embodiment these pins are hydraulically operated. Therefore, the pin 65 is shown as provided on the outer end of a piston rod 67 while the pin 66 is provided on the end of a piston rod 68, see Fig. 15. The piston rod 67 carries a piston 69 within a cylinder 70 mounted upon the lower leg 53 of the hook and the rod 68 similarly carries a piston 71 within a cylinder 72 also mounted upon the leg 53. The cylinders 70 and 71 are mounted in axial alignment with their closed ends adjacent each other and with the latching or locking pin portions 65, 66 of the piston rods 67 and 68 adjacent the side plates 58, 60 and 59, 61 of the hook. These side plates of the hook are provided with bores such as 73 which are aligned when the legs 53 and 54 are disposed as shown in Fig. 4, so that fluid pressure supplied behind the pistons 69 and 71 can project the pin portions 65 and 66 outwardly through these bores, as shown in Figs. 9 and 10, thus locking or latching the lower leg 53 of the hook to the upper leg in the U-shaped configuration. When it is desired to release the lower leg 53 for relative pivoting of the legs, fluid under pressure is supplied to the cylinders 70 and 72 in advance of the pistons 69 and 71 thus retracting the pin portions 65 and 66 from the bores 73 so that the legs are then free to pivot about the pivot pins 62 and 63. The mechanism for controlling the application of fluid pressure to the cylinders 70 and 72 will be hereinafter described.

Preferably the bores 73 in the plates 58 and 59 for the latching or locking pins 65, 66 are provided with removable bushings such as 74 while the portion of the plates 60 and 61 about the bores are reinforced as by means of plates 75 thus increasing the bearing surface for the latching pins. The side plates 58 and 59 of the upper leg 54 of the hook are each provided with laterally directed pads 76, 77 carrying adjustable abutment screws 78 and 79 which are adapted to engage the edges of the plates 60 and 61 on the lower leg to accurately define the proper position of the lower leg for alignment of the latching pins 65, 66 with the bores 73 in the upper plate members 58, 59.

The lower leg or portion 53 of the hook is provided with a rearwardly extending portion, generally designated 80. This rearwardly directed portion 80 provides a support for the operating mechanism which effects expansion of the leg 53, and operation of the latching or locking pins. The portion 80 is also provided with horizontally spaced, vertically extending supporting plates or brackets 81, 82, 83 and 84 adjacent either longitudinal side thereof, see Figs. 7 and 10. Between the plates or brackets 81, 82 is rotatably journaled a pulley or sheave 85 and a similar pulley or sheave 86 is journaled between the plates 83, 84. The several plates 81, 82, 83 and 84 are provided with guide members such as 87 adjacent the peripheries of the sheaves, which guide members are substantially triangular in cross section and serve to guide the supporting cables into the sheaves and prevent their entrance between the latter and the supporting plates. Similar guide members or plates are provided for the sheave 57. An arcuate member 88 is connected to the outer end of portion 80 and to a connecting plate member 89 which extends between the side plates 60 and 61. The member 88 ensures proper operation of limit switches controlling the hoisting of the hook when the latter is tilted, as hereinafter described and also serves as a guard or bumper to protect the operating mechanism upon the portion 80 of the hook.

The reeving of the supporting cables 47, 48 for the hook about the various sheaves and drums will be apparent from the diagrammatic representation in Fig. 11. As shown therein, the drum 49 is provided with three separate scored or groved portions 90, 91 and 92, while the drum 50 is provided with a single centrally located scored or grooved portion 93. The cable 47 has one end thereof connected to the drum 49 and the adjacent portion of the cable then is wrapped a plurality of times around the scored portion 90 of that drum. This cable then passes downwardly and around the sheave 86 of the hook, thence upwardly and about a direction changing pulley or sheave 94 which is rotatably mounted upon the support 44 with its axis substantially at right angles to that of the pulley or sheave 86. Cable 47 then passes over a second direction changing pulley or sheave 95, whose axis is substantially parallel with that of the pulley or sheave 94, and thereafter passes downwardly and about the sheave 85 after which the cable 47 passes upwardly and over the scored portion 92 of the drum 49 a plurality of times, the end of the cable being secured to the drum. One end of the cable 48 is also secured to the drum 49 and this cable, after passing a plurality of times around the portion 91 of the drum 49, is then directed over a direction changing pulley or sheave 96, whose axis is substantially parallel with that of drum 50, after which the cable extends downwardly and about the sheave 57, thence upwardly and about the scored portion 93 of the drum 50, the end of the cable being secured thereto.

The construction just described is such that, when the pins 65 and 66 are in latching or locking position and the main hoist motor 51 is energized to rotate the drum 49 in a clockwise direction, the motor 52 not then being energized, the cables 47 and 48 are payed off the drum 49 at the same rate so that the hook 46 is lowered while maintained substantially horizontally. Conversely, energization of the motor 51 in the reverse direction elevates the hook 46 while the latter is maintained substantially horizontally. Tilting of the hook 46 may be effected by energization of the motor 52. Thus, energization of the motor 52 in a direction producing clockwise rotation of the drum 50 pays out the cable 48, thereby allowing the forward end of the hook to tilt downwardly. Conversely, energization of the motor 52 in the opposite direction raises the forward end of the hook. When the hook has been tilted to any desired position, it may be raised or lowered, while retained in this tilted position, by simply energizing the motor 51 while maintaining the motor 52 deenergized. If desired, tilting, combined with a raising or lowering operation, may be effected by simultaneous energization of the motors 51 and 52.

In addition to the above mentioned movements of the material handling member or hook 46, it will be remembered that the relationship between the legs 53, 54 may be altered by releasing the latching or locking pins 65 and 66 and then swinging one of the legs relative to the other. In order to prevent unnecessary shocks to the apparatus, this unlatching or unlocking is preferably effected when the two legs 53 and 54 are extending vertically downward in parallel relationship, as is shown in the intermediate broken line representation in Fig. 4. At such time fluid pressure is supplied to both the cylinders 70 and 72 in advance of the pistons 69, 71, thus retracting the locking or latching pins so that pivoting or swinging of one leg relative to the other may be effected about the pivot pins 62, 63 as centers. Thus, by energizing the motor 52 for rotation in the direction which raises the sheave 57, the upper leg 54 then moves upwardly relative to the leg 53 until it is approximately in alignment with the lower leg as indicated in the lower broken line representation in Fig. 4. The entire material handling member or hook 46 may then be raised or lowered by operation of motor 51.

The positioning of the legs 53 and 54 of the hook as just described facilitates entrance of the latter between the supporting rods or pipes 25 for the coils or annular bodies C. Hence, the storage area may be more completely utilized, since it is no longer necessary to leave large open areas adjacent the piles of coils C to accommodate the upper leg of the hook as is the case when the two legs must remain in parallel relationship at all times, the resulting saving of storage area being in the order of 20%.

When it is desired to again latch the two legs 53, 54 together for movement as a unit, the motor 52 is rotated in a direction lowering the upper leg 54 until it is disposed in substantially parallel relationship with the lower leg 53, at which time the plates 58, 59 of the upper leg will abut the adjustable stop screws 78, 79 on the lower leg. This accurately positions the openings 73 in alignment with the latching pins 65, 66 so that the application of fluid pressure behind the pistons 69, 71 projects the latching pins 65, 66 outwardly into locking or latching position, securing the two legs of the hook together. In the event the openings 73 are not thus properly aligned when the plates 58, 59 have engaged the stop screws 78, 79, the latter may be adjusted to secure the proper relationship of the openings 73 with the latch pins and the adjusting screws then locked in the adjusted position by lock nuts, or the like, provided thereon.

When the two legs of the material handling hook have again been latched together, the hook may then be raised, lowered or tilted, as has just been described, by operation of motors 51, 52. Operation of the motor 52 to effect raising or lowering of the forward end of the hook is preferably combined with operation of the motor 51 when it is desired to move the hook from horizontal to vertical, or conversely, in a minimum of space. Control of the motors 51, 52 is readily effected by means of drum type controllers 97 and 98, see Fig. 16, provided in the operator's cab 45, the controller 97 being utilized for the motor 51, while the controller 98 is utilized for the motor 52.

The manner in which the motors 51 and 52 are controlled will be apparent from Fig. 16, which illustrates in schematic form a simplified form of wiring diagram for the motors. As represented therein, the motors 51 and 52 are preferably of direct current, series type and the power supply for operation thereof is from direct current power supply lines L1, L2 which it will be understood are connected to the conductors 41 through trolley members, as previously described. As mentioned above, the switches or controllers 97, 98 are preferably of the drum type and in the form illustrated are each provided with two sets of conductive portions which may be in the form of strips of metal or the like carried by an insulated portion of the drum and constituting the movable contacts of the controllers. Thus, the drum 97 is provided with conductive portions or strips 97a, 97b, and 97c which are mounted in substantially axial alignment. Circumferentially spaced from the portions or strips 97a, 97b, and 97c is a second set of such strips or portions 97d and 97e, which are likewise in axial alignment. The controller drum 98 is likewise provided with similar conductive portions or strips 98a 98b, 98c 98d, 98e, 98f and 98g.

Each of the drums 97, 98 is adapted to be actuated by a handle 97h, 98h, respectively, which preferably is in the form of a crank movable between either of three positions to selectively dispose the conductive portions 97a—97e and 98a—98g in the positions shown in Fig. 16 or to selectively place the sets of conductive segments in engagement with the stationary contacts of the controllers, which stationary contacts are mounted upon insulating strips non-rockably supported with respect to the drums. Thus, the controller 97 has stationary contacts 99, 100, 101, 102, 103, 104 and 105 supported upon a stationary mounting 106, while the controller 98 has the contacts 107, 108, 109, 110, 111, 112, 113, 114 and 115 supported upon the stationary mounting 116. The said stationary and movable contacts for the controller or drum 97 are so positioned that when the handle 97h is rotated in a counterclockwise direction the conductive strip 97a is adapted to engage and bridge the contacts 99, 100. At the same time the conductive strip 97b engages and bridges the contacts 102, 103 and the conductive strip 97c engages and bridges the contacts 104, 105. Upon rotation of the handle 97h in a clockwise direction, the conductive portions or strips 97a, 97b and 97c are first moved from engagement with the stationary contacts and the continued clockwise rotation places the conductive strip 97d in bridging engagement with the contacts 100, 101 and the conductive portion or strip 97e in bridging relationship with contacts 104, 105. Similarly, counterclockwise rotation of crank or handle 98h places the conductive portion or strip 98a in bridging engagement with the contact 108. At the same time the conductive strip 98b engages contacts 109, 110 and the conductive strip or segment 98c bridges the contacts 113, 114. Rotation of the crank 98h in the reverse or clockwise direction is effective to engage the conductive strip or portion 98d with contact 107, strip 98e with contacts 109 and 110, strip 98f with contacts 111 and 112, and strip 98g with contacts 114 and 115. It will also be noted that the strips or conductive portions 98a, 98d, 98e and 98b are permanently interconnected.

In the simplified circuit illustrated, the line L1 is connected with the contact 100 of controller 97 through a circuit breaker 117, and wire 118, while the line L2 is connected to the contact 104 through a circuit breaker 119, and a wire 120. A wire 121 extends from the stationary contact 99 of the controller 97 to a connection between the field winding 122 and the armature 123 for the motor 51. The contact 105 is connected by a wire 124 to one terminal of an electromagnetically operated brake 125 of conventional construction normally preventing rotation of the armature shaft of motor 51 but which is released when the brake coil is energized. The other terminal of the brake 125 is connected with the field winding 122 and the circuit continues in series through the armature 123 to a wire 126 which is connected to a terminal of a contactor for the motor 51, the wire 126 being connectible to a wire 127, extending to the contact 101, by means of the contact 128 of the contactor when the latter is energized. The wire 127 is also connected to one terminal of the coil 129 of the contactor, the other terminal of the coil being connected to a wire 130 through the normally closed contacts of limit switches 1LS1, 1LS2 and 1LS3, the wire 130 also being connected to the stationary contact 105. The limit switches 1LS1, 1LS2 and 1LS3 are mounted to be actuated by the material handling member or hook, if the latter be raised to an excessive height, as will hereinafter be apparent, thereby terminating operation of the motor 51. The contact 102 of the controller is connected to the armature 123 of motor 51 through a circuit comprising wire 131, resistance 132 and a wire 133. The contact 103 is connected with the contact 105 by wires 134 and 124.

The power supply line L2 is connected to the stationary contact 109 of the drum controller 98 through a circuit breaker 135 and wire 136. Contact 112 of the controller is connected to one terminal of a resistance 137 and the other terminal of this resistance is connected to one terminal of the armature 138 of the motor 52. The other terminal of the armature is connected to the contact 115 of the controller 98 by means of wires 139 and 140. The contact 113 of the controller is connected by a wire 141 to a point intermediate the resistance 137 and armature 138 of the motor 52. Contact 110 of the controller 98 is connected with contact 115 thereof through a circuit comprising wire 142, resistance 143, wire 144, the field winding 145 of motor 52, and the wire 140. Contact 111 of the controller is connected to the resistance 142 by a wire 146. Contact 114 of the controller is connected by wire 147 to one terminal of an electromagnetically operated brake 148 for the motor 52 which brake is similar to the brake 125. The other terminal of the brake 148 is connected to a stationary contact of a contactor, the movable contact 149 of which is adapted, when the contactor is energized, to complete a circuit to power line L1 through wire 150 and circuit breaker 151. One terminal of the coil 152 of this contactor is connected to wire 150 and the other terminal is connected by wire 153 to stationary contacts of a screw operated limit switch SLS. The switch SLS is provided to prevent excessive tilting of the hook when effected in mid-air and is of conventional construction comprising a screw 154 driven in timed relation with drum 50 to cause a nut-type contact actuator 154a to selectively operate either contact SLS1 or SLS2 depending upon whether motor 52 is being utilized for lowering or raising the forward end of the hook. The contact SLS1, when closed, provides a circuit therethrough from wire 153 to a wire 155 connected to contact 107 of the controller 98. Contact SLS2, when closed, provides a circuit therethrough from wire 153 to the limit switches 2LS1, 2LS2 and 2LS3 connected in series and to contact 108 of controller 98. These switches are mounted to be actuated by the material handling member or hook, if the latter be raised to an excessive height, thus opening the circuit to the contactor thereby terminating operation of the motor 52.

It will now be apparent that when it is desired to raise the forward end of the hook, that is, to produce an upward tilting thereof, the drum controller 98 is rotated in the counterclockwise direction, thus moving the conductive segments or strips 98a, 98b and 98c into engagement with the contacts 108, 109 and 110, 113 and 114, respectively. This provides a circuit from the power line L1 through the circuit breaker 151, coil 152 of the contactor, contact SLS2 and switches 2LS1, 2LS2 and 2LS3 to the contact 108. This is now engaged by strip 98a which is connected with strips 98d, 98e and 98b. The latter is now in engagement with contacts 109 and 110 so that the circuit is completed through wire 136 and circuit breaker 135 to the power supply line L2. This energizes the contactor moving its contact 149 to circuit closing position thus completing a circuit energizing the motor 52. This circuit extends, as previously described, from L1 through circuit breaker 151, wire 150, contact 149, coil 148 of the motor brake, wire 147, contact 114, conductive strip 98c, contact 113, wire 141, armature 138, wire 139, field winding 145, resistance 143, contact 110, conductive strip 98b, contact 109, wire 136 and circuit breaker 135 to the power supply wire L2. Hence, the brake is released and the motor 52 is energized thus rotating the drum or reel 50 in a direction raising the forward end of the hook.

If the forward end of the hook be raised to an excessive height as the result of operation of motor 52, one of the limit switches SLS, 2LS1, 2LS2 or 2LS3 is actuated, as hereinafter explained, thereby moving its contact from the position shown in Fig. 16. Actuation of any of these limit switches therefore breaks the circuit through the coil 152 of the contactor deenergizing the latter so that contact 149 moves to open position. This in turn deenergizes the motor armature 138 and field 145 as well as the coil 148 of the brake thus terminating operation of the motor and applying the brake.

The drum controller 98 may then be moved in the reverse direction to lower the forward end of the hook 46 thus causing the conductive portions or strips 98d, 98e, 98f and 98g to engage the stationary contacts 107, 109 and 110, 111 and 112, 114 and 115, respectively. The coil 152 of the contactor is now energized through a circuit extending from L1 through circuit breaker 151, coil 152, contact SLS1, wire 155, contact 107, conductive strips 98d and 98e, contact 109, wire 136, and circuit breaker 135 to power line L2. This closes the contact 149 thus completing a circuit through brake coil 148, wire 147, contact 114, conductive strip 98g, contact 115, wires 140, field 145, wire 144, resistance 143, wire 142, contact 110, conductive strip 98e, contact 109, wire 136, and circuit breaker 135. The armature 138 is also connected in shunt with the field 145 through wire 139, resistance 137, contact 112, conductive strip 98f, contact 111, and wire 146. Consequently, the brake is now energized releasing the latter and the motor 52 is connected for effecting lowering of the forward end of the hook with dynamic braking. This operation may also be controlled by repeated operations of the controller 98 from the position just described to that illustrated in Fig. 16 thus repeatedly releasing and applying the brake. When the forward end of the hook has dropped below the predetermined maximum height which resulted in actuating a limit switch, the actuated switch returns to its initial position and the circuit is prepared therethrough for operation as previously described. Excessive paying off of cable 48, which might occur if motor 52 be energized for lowering after the upper leg of the hook is substantially vertical with the forward end lowermost, is prevented by actuation of contact SLS1 by the nut-type actuator 154a, it being remembered that screw 154 is rotated in timed relationship with the rotation of drum 50.

The hook may be bodily raised and lowered by operation of the drum controller 97, thus regulating energization of brake 125 and motor 51 in a manner similar to that described for motor 52 and brake 148 in tilting the forward end of the hook. Since these circuits are similar to those just described, they need not be traced in detail. Suffice it to note that rotation of the drum controller 97 in a clockwise direction energizes motor 51 and the coil of brake 125 thus releasing the latter and rotating the drum 49 in a direction which takes up both the cables 47 and 48. Hence, the hook 46 is raised substantially without tilting. If the hook should be raised beyond a predetermined maximum height, one of the limit switches 1LS1, 1LS2, or 1LS3 is actuated deenergizing the motor 51 and applying the brake. Rotation of the drum controller 97 in the reverse or counterclockwise direction releases the brake for motor 51 and connects the latter for lowering the hook with dynamic braking and/or further control by repeated application and release of the brake as will now be readily apparent.

While the controllers 97 and 98 have been described as separately actuated, it will be apparent that they may be simultaneously actuated by the operator to effect tilting combined with raising or lowering. Also, while the controllers and motor connections have been rather simply illustrated, it will be apparent that, in actual practice, the controllers and circuits will normally be arranged to provide for multiple speeds of the motors, various safety devices and other conventional features which have been here omitted for the sake of clarity.

The limit switches 1LS1, 1LS2 and 1LS3 are mounted upon the support member 44 in spaced relationship as indicated in Fig. 4 and preferably the switches 2LS1, 2LS2 and 2LS3 are correspondingly mounted in spaced relationship with switches of like suffix number adjacent each other. Each of these limit switches comprises an outwardly extending arm for actuation of the movable contact thereof, switches 1LS1, 2LS1 and 1LS3, 2LS3 being located adjacent the forward and rear portions of the hook as shown in Fig. 4 and having their operating arms connected by flexible members, such as chains 156 and 157, with a substantially horizontally extending member 158. This member 158 is positioned above the material handling hook 46 and comprises a framework which is adapted to be engaged and lifted by the hook if the latter is to be moved upwardly above a predetermined maximum height. Thus, if the forward end of the hook is raised excessively, the forward portion of the member 158 would be raised, relieving its weight from the chain or chains 156 so that the actuating arms of limit switches 1LS1 and 2LS1 can move to operate their contacts, as previously described, the switch contacts normally being biased to open position. Likewise, if the rear portion of the hook 46 is raised excessively, the member 158 The coil 152 of the contactor is now energized through would be elevated adjacent its rear portion, thus allowing the limit switches 1LS3 and 2LS3 to move their contacts to open position. If the hook be raised to an excessive height while extending substantially horizontally, all of the limit switches 1LS1, 2LS1, 2LS3 and 1LS3 would be actuated. Also, contact SLS2 of the screw operated limit switch SLS would be opened.

The member 158 utilized for actuation of the limit switches 1LS1, 2LS1, 1LS3 and 2LS3 is provided with upwardly extending bracket members 159 and 160 adjacent the forward and rear ends of the member 158. These bracket members each have a horizontally directed portion such as 161 extending above a corresponding horizontally directed portion of the frame 44 and resting thereon so as to prevent the weight of the member 158 from being applied to the arms of the limit switches 1LS1, 1LS3, 2LS1 and 2LS3.

The limit switches 1LS2 and 2LS2 are adapted to be actuated by the cable 48 when the angularity of the latter with respect to the vertical exceeds a predetermined amount and the hook is then raised to an excessively high position. Under such conditions, the portion of the hook adjacent the sheave 57 might be raised to too high an elevation before the frame 158 is engaged and raised for operation of the limit switches 1LS1, 2LS1, 1LS3 or 2LS3. In such a situation, however, the angularity of the cable 48 with respect to the vertical will have increased to an extent such as to actuate the switch. To permit such actuation the pivoted arms 162 of the limit switches 1LS2 and 2LS2 are disposed adjacent a plate 163 which is pivoted to the frame member 44 and extends transversely with respect thereto, the plate 163 being located so as to be engaged by the cable 48 as will be apparent from the broken line representation of Fig. 4. Consequently, excessive raising of the hook when the two legs have swung relative to each other actuates switches 1LS2 and 2LS2 to terminate operation of both motors 51 and 52 in the direction which would cause further raising of the hook.

As mentioned heretofore, the lower leg 53 of the hook is laterally expansible and for this purpose it is preferably formed as two separate interconnected parts, the line of division extending substantially longitudinally of the leg. In the form of the device shown in the drawings, this lower leg is in the shape of a substantially rectangular hollow portion 164, see Fig. 6, rigidly connected with the vertically extending plates 60, 61 and the portion 80 of the hook, this hollow portion 164 being formed by suitable longitudinally extending plates strengthened by transversely extending plates or ribs such as 165 and 166 with the forward end of the portion 164 tapering to a somewhat blunt point. The lower portion of this leg of the hook member is formed by a substantially plate-like member 167 which is mounted for movement laterally with respect to the portion 164 as indicated by the broken line positions thereof shown in Fig. 6. This lower portion 167 of the leg 53 is preferably strengthened by longitudinally extending members 168 which terminate short of the tapering forward end corresponding with the point of the portion 164, and the portion of tapering width of the plate 167 is preferably provided with strengthening ribs 169.

Movement of the plate 167 relative to the portion 164 is effected, in the illustrated embodiment, by fluid pressure operated means. This is accomplished by providing a fluid pressure cylinder 170 within the hollow portion 164 of the leg 53, the rear end of this cylinder being pivotally supported upon suitable brackets 171 connected with the top of the portion 164. Slidably disposed within the cylinder 170 is a piston 172, see Fig. 15, to which a piston rod 173 is connected. The piston rod extends exteriorly of the forward end of the cylinder and the outer end thereof is pivoted to a rod 174. The ends of the rod 174 are received in suitable apertures in the outer ends of longitudinally extending bars 175 and 176 and is pinned thereto, see Fig. 8. The rear ends of these bars are connected to a transverse plate 177 which is in turn connected to the forward ends of longitudinally extending bars 178 and 179. The rear ends of the bars 178 and 179 are each pivotally supported at 180 upon suitable brackets in the rear portion 80 of the lower leg 53 of the hook, see Fig. 6.

Intermediate the outer ends of bars 175, 176 and of the piston rod 173, the rod 174 has the outer ends of links 181 and 182 pivoted thereon. The other ends of these links are pivoted on a rod 183 supported in brackets 184 and 185 mounted upon the plate 167. Adjacent the pivot rod 183, the brackets 184 and 185 have elongated vertically extending slots, such as 186, in which is disposed a transversely extending pin 187 carried by the links 181 and 182, the pin and slots providing a slight longitudinal movement of plate 167, as hereinafter described, after the plate 167 has engaged the interior of a body in which leg 53 is positioned. Actuation of the links is effected by virtue of the cylinder 170 being provided with fluid inlet and outlet conduits 188 and 189, on either side of the piston 172 and adjacent either end of the cylinder, which are connected as hereinafter described to a source of fluid under pressure.

In order that the plate 167 will be maintained substantially parallel with the portion 164 during the relative movement therebetween, the forward part of the plate 167 is pivotally connected with the portion 164 in substantially the same manner as that just described for the rear part of this plate. That is to say, a pair of longitudinally extending bars 190 and 191 are respectively pivoted to brackets 192 and 193 which are secured to the side walls of the portion 164 adjacent the lower edge of the latter and spaced slightly forwardly of the transverse plate 177. The forward ends of the bars 190 and 191 are joined together by a transversely extending plate or member 194, see Fig. 8, to which are connected spaced longitudinally extending bars 195 and 196, the forward ends of the latter being connected to a pivot rod or shaft 197. Pivoted to substantially the middle portion of the rod or shaft 197 is the lower end of a piston rod 198, the inner end of which extends into a fluid pressure cylinder 199. The rear end of this cylinder is pivotally supported at 200 to brackets located substantially centrally of the upper portion 164 of the leg 53 and forwardly of the transverse rib 165 thereof. The piston rod 198 is provided interiorly of the cylinder 199 with a piston 201 and the cylinder is provided with fluid pressure inlet and exhaust connections 202 and 203 disposed on opposite sides of the piston 201, see Fig. 15.

Pivotally supported on the pivot shaft 197 are the outer ends of spaced links 204 and 205. These links are positioned on the shaft 197 intermediate the ends of the bars 195, 196 and the end of the piston rod 198. The rear ends of the links 204 and 205 are pivoted by a pin 206 supported in plates or bracket members 207 carried by and upstanding from plate 167. It will be seen therefore that this construction is substantially similar to that just described as interconnecting piston rod 173 with the rear portion of the plate 167. The brackets 207 are likewise provided with elongated slots, such as 208, see Fig. 6. Adjacent the pivot pin 206 and extending through these slots and carried by the links 204, 205 is a pin 209, this pin and cooperating slots operating, as hereinafter described, to permit a slight longitudinal movement of plate 167 rearwardly of the hook proper, as viewed in Fig. 6, after the plate 167 has been moved to its fully expanded position corresponding with the internal diameter of a body in which the leg 53 of the hook member is positioned.

The construction just described is such that, with the parts in the positions shown in solid lines in Fig. 6, the application of fluid pressure to the conduits 188 and 202 and exhaust of the cylinders through the conduits 189 and 203 moves the pistons 172 and 201 forwardly, thereby moving the plate 167 relative to the portion 164, the motion continuing until the portion 164 and plate 167 are firmly engaged with the interior of an annular body in which the leg 53 of the member or hook 46 is positioned. During this movement, the plate 167 is maintained substantially parallel with the portion 164 and the pins 187 and 209 will normally occupy the uppermost ends of the slots, 186 and 208, in the brackets to which the links 181, 182 and 204, 205 are pivoted. When the plate 167 initially engages the inner periphery of the annular body or bodies C into which the leg 53 has been inserted, the pins 187 and 209 will still be in the positions referred to, while the positions of the cylinders 170 and 199 and connected parts will be substantially as indicated in the upper of either of the broken line positions shown in Fig. 6. Further application of fluid pressure to the cylinders 170 and 199, after engagement of the plate 167 with the interior of the annular body or bodies C causes the plate 167 to move slightly rearwardly, that is, to the left as viewed in Fig. 6, so that the pins 187 and 209 then occupy the lower portions of the slots 186 and 208, the positions of the links being as indicated by the lowermost broken line positions of either of the said broken line positions in Fig. 6 from which it will be seen that the links 181, 182 and 204, 205 are at that time substantially horizontal. This additional rearward movement, as provided by the pins 187 and 209 and the cooperating slots in the brackets 184, 185, 207 enables outward extension of finger-like projections at the end of the leg 52, as hereinafter described.

The two sets of broken line positions of parts shown in Fig. 6 represent two different positions of the plate 167 corresponding with two different internal diameters of annular bodies C to be handled thereby. It will be understood, however, that the positions shown are not critical and that the hook may be employed with annular bodies of any size intermediate the extreme size represented by the lowermost dotted position of the plate 167 and the minimum size which is represented by substantially the full line position of the plate 167. Moreover, as will hereinafter appear, the pressure exerted upon the annular bodies C by the hook is substantially the same regardless of the inner diameter of the bodies.

The firm engagement of the portion 164 and the plate 167 with spaced portions of the interior of the coils or other annular bodies handled, as a result of the above-mentioned expansion or movement of the plate 167 relative to the member 164, serves to very firmly hold the coils or other annular bodies upon this leg of the hook. However, since it is intended that the hook be tilted and the lower leg swung to a substantially vertical position, it is desirable to provide a still more positive means for preventing displacement of the coils or other annular bodies over the end of the hook and for this purpose the expanding leg 53 of the hook is preferably provided with finger-like projections which are adapted to be moved transversely outwardly with respect to the leg in timed relationship with the expanding action thereof.

In the form of the apparatus illustrated, the links 204, 205 have their forward ends provided with transversely extending projections or finger-like portions 210 which in the contracted position of the leg 53, are normally disposed completely therein, these finger-like projections likewise remaining inwardly of the plate 167 when the latter is being moved or expanded into engagement with annular bodies C, in which the leg 53 has been inserted, until after the plate 167 and portion 164 have engaged the side walls of the openings in such bodies. After such engagement, however, the continued application of fluid pressure to the cylinders 170 and 199 results in a slight longitudinal movement of the plate 167 rearwardly, as viewed in Fig. 6, which as previously mentioned, is permitted by the elongated slots 186, 208 and the cooperating pins 187 and 209. This movement of the plate 167 disposes the links 204, 205 in substantial parallel relationship with the plate 167 so that the finger-like portions 210 then project outwardly or transversely with respect to the plate 167 through suitable openings such as 211 provided therein. Since the plate 167 is in engagement with the side walls of the openings in the annular bodies C positioned thereon, this projection of the finger-like portions 210 beyond the plate 167 disposes the fingers in overlying relationship with respect to the inner corner or edge of the outermost body on the leg 53 or, if the bodies supported thereon are coiled wire or rod and the outermost body overlies the openings 211, the projections or fingers 210 will be forced between the strands of the coiled material. In either event the finger-like projections provide a positive means for preventing the annular bodies C from sliding over the end of the hook when the latter is moved to a vertical position as shown in the broken lines in Figs. 1 and 4.

To further prevent displacement of the coils or other annular bodies over the end of the leg 53 when the latter is tilted, the upper portion 164 of this leg is likewise provided, adjacent its end with finger-like members or projections which are adapted to be extended transversely outwardly therefrom when the leg has been fully expanded into engagement with the central openings in the bodies supported thereon. Thus, elongated members 212 and 213, see Figs. 6 and 12, having laterally extending finger-like projections such as 214 adjacent one end, are pivoted adjacent their opposite ends to the portion 164 of the expanding leg 53 at either side of the top interior of the latter, this pivoting being effected by means of suitable pins and brackets, such as 215.

Operation of these members 212, 213 is effected by individual fluid pressure actuators comprising cylinders 216 and 217, each provided with a piston 218 and 219, respectively, and having fluid pressure connections 220, 221 and 222, 223 on either side of the said pistons, see Fig. 15. Connected with the pistons 218 and 219, respectively, are piston rods 224 and 225 which extend outwardly from the cylinders. The outer ends of the piston rods are provided with eye portions such as 226, see Fig. 14, and each eye portion is provided with a pivot pin, such as 227, the ends of the latter being received in the spaced arms of a yoke portion 228 provided on one end of a link 229. The other end of each link 229 is pivotally supported upon the adjacent side wall of the portion 164 of leg 53 by a bracket 230, see Fig. 8. Pivotally supported upon each pin 227, intermediate the eye portion 226 and the arms of the yoke 228, are pairs of links 231, 232, the other ends of which are pivoted to the corresponding members 212, 213, respectively, by means of pivot pins such as 233.

The construction is such that the links 229, 231 and 232 constitute toggle linkages for operating the elongated members 212 and 213. Hence, when fluid pressure is supplied to the cylinders 216, 217 through the conduits 220, 222 the pistons 218 and 219 are moved outwardly, that is to the right as viewed in Fig. 15, thus causing the links to move the members 212, 213 from their full line positions as shown in Fig. 6 to their broken line positions. In the latter positions the finger-like projections 214 of the members 212, 213 extend outwardly from the portion 164 through suitable openings therein. Consequently, the projections 214 will act to retain coiled material or other annular bodies on the leg 53 of the hook in the same manner as described with respect to the finger-like projections 210.

To further assist in preserving the proper positions of coils or other annular bodies supported on the expanding leg 53 of the hook, the lower surface of the plate 167 may be provided with spaced fixed projections 234 which, in the form shown, comprise transversely extending rods or bars welded to the lower surface of the plate at spaced points therealong, the spacing between the bars 234 preferably corresponding to, or being greater than, the greatest axial length of annular bodies normally handled by the hook.

The mechanism for providing fluid pressure and controlling its application to the cylinders 70, 72, 170, 199, 216 and 217 is carried by the hook 46 and is preferably located in the portion 80 of the hook provided at the rear of the lower leg 53, see Figs. 6, 7 and 10. The construction and operation of this fluid pressure system can best be understood with reference to the diagrammatic representation thereof shown in Fig. 15 in which the parts bear the same reference numerals as the corresponding elements shown in Figs. 6, 7 and 10 which illustrate a practical embodiment of the mechanism in a commercial form of apparatus. The fluid pressure system is preferably of the hydraulic type employing oil or other suitable fluid therein. Therefore, the system comprises a tank or reservoir 235 for the fluid which is withdrawn therefrom by action of a pump 236 connected with the tank 235 by a conduit 237, the end of the conduit 237 within the tank being provided with a strainer 238. The pump 236 is preferably operated by an electric motor 239 controlled as hereinafter described.

The output of the pump 236 is connected by a pipe or conduit 240 to a pressure relief valve 241 of conventional construction to which is connected a conduit 242 providing a return for the fluid to the reservoir 235 when the pressure of the fluid exceeds the predetermined value for which the valve 241 is set. Normally, however, the fluid is forced from the valve 241 through conduits 243 and 244 to two separate double solenoid operated, spring return valves generally designated 245 and 246, respectively. These valves are of conventional construction and may be such as is manufactured by Vickers, Inc. of Detroit, Michigan and known as DG–5S4–061–C and which is shown in drawing No. R–106911 published by that company for use in connection with sales and service of the valve, see also Bulletin 48–27 copyrighted in 1948 by Vickers, Inc. Such a valve is operated by two separate solenoids which act alternately to actuate the valve for directing the fluid under pressure from the inlet conduit to either one of two outlet conduits, the other of these outlet conduits being then connected through the valve to an exhaust conduit providing a return to the tank or reservoir. Thus, the valve 245 is provided with the operating solenoids 247 and 248 which act alternately to direct the fluid under pressure from the inlet conduit 243 to either one of the two outlet conduits 249, 250, the other of these outlet conduits being then connected through the valve 245 to an exhaust conduit 251 providing a return of the fluid to the tank or reservoir 235. Similarly, the valve 246 is operated by the two separate solenoids 252 and 253 which act alternately to direct the fluid under pressure from the inlet conduit 244 to either one of the two outlet conduits 254, 255, the other of these outlet conduits then being connected through the valve 246 to a conduit 256 which is connected with the exhaust conduit 251 providing a return of the fluid to the tank 235.

It will be evident, therefore, that energization of the solenoid 252 will supply fluid under pressure through the conduit 254 to the cylinders 70 and 72 behind the pistons 69, 71 thereby moving the latching or locking pins 65, 66 into the openings 73 provided in the members 58, 59 of the upper leg of the hook. Simultaneously, the regions in advance of the pistons 69, 71 will be exhausted through the conduit 255 and valve 246 to the conduit 256 and thence to the tank or reservoir 235. Conversely, energization of the solenoid 253 is effective to supply fluid under pressure through the conduit 255 to the cylinders 70 and 72 in advance of the pistons 69, 71 thus retracting the latching pins 65, 66 from engagement with the opening 73 so that the two legs of the material handling member or hook may swing or pivot relative to each other. At this time the region in the cylinders 70, 72 behind the pistons is exhausted through the conduit 254 and valve 246 to the exhaust conduit 256.

The conduit 249 of valve 245 is connected with a sequence and check valve 257 of common commercial form likewise manufactured by Vickers, Inc., the valve being of the type identified by the number RC–104–D2 and illustrated in the drawing No. E–38713 of that company, see also Bulletin 45–34 copyrighted in 1946 by Vickers, Inc. The valve 257 is provided with two outlet conduits 258 and 259, the conduit 258 being connected with the conduits 188 and 202 for the cylinders 170 and 199, while the conduit 259 is connected with the conduits 220 and 222 for the cylinders 216 and 219. This sequence valve 257 is of the spring loaded type such that, when fluid pressure is supplied thereto through conduit 249 the fluid under pressure is transmitted therethrough directly to the conduit 258 until the pressure therein exceeds a predetermined value whereupon fluid under pressure is also supplied to the conduit 259. The valve 257 includes a one-way check valve permitting free fluid flow from the conduit 259 in the opposite direction so that fluid can exhaust from both the conduits 258 and 259 through the conduit 249 when permitted by the valve 245.

In addition to the previously mentioned conduits connected to the valves 245 and 246, they are also provided with drain conduits 260, 261, respectively, which permit draining of that portion of the fluid used to assist the solenoids in effecting valve movement. The valve 257 is also provided with a drain pipe 262 which is never in direct communication with the conduits 249, 258 or 259 but which is necessary to carry off any leakage about the movable portion of the valve. These drains, while necessary to proper operation of the valves, are conventional and their nature and purpose will be readily apparent from an inspection of the above mentioned bulletins of Vickers, Inc. While certain of the drains have been shown as connected together, it will be obvious that separate pipes for each may be provided.

The conduit 250 is connected with a counterbalance valve 263 of conventional construction, such as that sold by Vickers, Inc., and illustrated in Bulletin 45–34 copyrighted 1946 by Vickers, Inc. and identified by the number RC–104–D1. The output of this valve 263 is connected to a conduit 264 which, in turn, is connected with the conduits 189 and 203 of cylinders 170 and 199, respectively, and the conduits 221 and 223 of the cylinders 216 and 217, respectively.

The counterbalance valve 263 is provided for the purpose of preventing excessively rapid exhaust of fluid pressure from in advance of the pistons such as 172, 201 and 218, 219 when the leg 53 is being expanded to thereby prevent shocks to the apparatus since, when the leg is in horizontal position, this exhaust would be assisted by the force of gravity exerted upon the plate 167 and the attached parts. The operation of the hydraulic system just described will be more fully apparent from the description hereinafter set forth.

Control of the operation of motor 239, of the solenoids 247, 248 for the valve 245 and of the solenoids 252 and 253 for valve 246 will be apparent from the simplified schematic circuit diagram shown in Fig. 17. As represented therein, the motor 239 is of the direct current, compound wound type and power is supplied for operation thereof and of the solenoids of the valve 245, 246 from the same direct current power supply lines L1, L2, connected with the conductors 41, as are utilized for the hoist motors 51 and 52. As illustrated in Fig. 17, a wire 265 connects the line L1 and one of the slip rings and brushes of the assembly SR, this circuit continuing to the armature 266 of the motor 239 through wires 267, 268, the other terminal of the armature 266 being connected by a wire 269 to one side of a series field winding 270 for the motor. The other terminal of this field winding is connected by wire 271 to a slip ring and brush of the assembly SR, the circuit continuing therefrom through a wire 272 to a circuit breaker 273 and from thence through a wire 274 to a stationary terminal 275 of a multiple contact, drum type controller or switch, generally designated 276. Connected with the wire 267 is a wire 277 which is also connected with one terminal of the shunt field winding 278 for the motor 239, the other terminal of this winding being connected by wire 279 to one of the slip rings and brushes of the assembly SR and then by a wire 280 to a stationary contact 281 of the switch 276. The contact 281 is bridged to a second stationary contact 282 of the switch 276 and the contact 282 is connected with the power supply line L2 through the wire 283.

The power supply line L1 is also connected to a stationary contact 284 of the switch or controller 276 by a wire 285 and adjacent to but spaced above the contact 284, as viewed in Fig. 17, is another stationary contact 286 which is connected with yet another stationary contact 287 located below the contact 284. The contact 287 is connected by a wire 288 to a slip ring and brush of the assembly SR and thence to corresponding terminals of the solenoids 247 and 248 for the valve 245. The other terminal of the coil 247 is connected through a slip ring and brush to a wire 289 extending to a stationary contact 290 of the circuit controller or switch 276, and the second terminal of the coil 248 is connected through a slip ring and brush to a wire 291 extending to a stationary contact 292 of the switch or controller 276.

As schematically represented in Fig. 17, the switch or controller 276 is preferably of the drum type, similar to the drum switches or controllers 97 and 98, and is therefore illustrated as provided with two sets of conductive portions which may be in the form of strips of metal or the like carried by the insulated portion of the drum and constituting the movable contacts of the switch or controller. Thus, the drum is provided with conductive portions or strips 293, 294 and 295 which are mounted upon the drum in substantially axial alignment. The drum or movable portion of the controller 276 is adapted to be actuated by a handle, which may be in the form of a crank 296 and in one position of the drum, as determined by operation of the crank 296, the contact or strip 293 is adapted to engage and bridge the stationary contacts 284 and 287. In the same position of the drum the contact or strip 294 will engage and bridge the contacts 275 and 282 and the contact 295 will engage and bridge the contacts 281 and 290. The movable portion or drum of the circuit controller 276 is also provided with a second set of conductive portions or strips 297, 298 and 299 which are arranged in axial alignment upon the drum and spaced from the contacts 293, 294 and 295. The conductive segment 297 is adapted in one position of the drum to engage and bridge the stationary contacts 284, 286 and simultaneously the conductive segment 298 will be in engagement with stationary contacts 282 and 292, while the contact segment 299 will engage and bridge the stationary contacts 275 and 281.

It will also be readily apparent from Fig. 17 that, when the conductive portions 293, 294 and 295 are in engagement with the cooperating stationary contacts, the conductive segments 297, 298 and 299 will be moved from engagement with their cooperating stationary contacts, and conversely. Consequently, only one of the solenoids 247, 248 can be operated at a given time and regardless of which solenoid is so operated, the motor 239 will be energized for rotation in but one direction.

The solenoids 252 and 253 for the valve 246 controlling operation of the latching pins are likewise electrically controlled by a drum type switch or controller, generally designated 300, see Fig. 17. This switch or controller 300 is constructed similarly to the controller or switch 276 and comprises a rockable insulated drum portion provided with two spaced rows of conductive portions or strips which in the central or "off" position of the drum are disposed on opposite sides of the stationary contacts. Thus, the drum or controller 300 has the conductive portions or strips 301, 302 and 303 arranged in spaced axial alignment and circumferentially spaced from the second set of conductive portions or strips 304, 305 and 306. The stationary contacts, respectively designated 307, 308, 309, 310, 311, 312, 313 and 314 are arranged in axial alignment adjacent the periphery of the drum 300 for selective engagement with the aforementioned contacts or strips 301—306 carried by the drum.

The power supply line L1 is connected to the stationary contact 308, while the power supply line L2 is connected to the contact 311. Contacts 311 and 313 are connected together by a wire 315 and contact 313 is then connected by a wire 316 to the wire 279 through the associated slip ring and brush of the assembly SR. The contact 307 is connected with the contact 309 and the latter is in turn connected by a wire 317 to a slip ring and brush of the assembly SR from which the circuit continues through a wire 318 and a tiltable mercury limit switch MLS to one terminal each of the solenoids 252 and 253. The other terminal of the solenoid 252 is connected through a slip ring and brush of the assembly SR to a wire 319 which is in turn connected with the contact 314. The second terminal of the solenoid 253 is connected through the slip ring and brush of the assembly SR to a wire 320 which is in turn connected with the contact 310. The contact 312 is connected with a wire 321 extending to and connected with the wire 274.

It will be apparent from the construction just described that rocking or partial rotation of the controller 300 in one direction moves the conductive strips 301, 302 and 303 into bridging engagement with the contacts 308, 309 and 311, 312 and 313, 314, respectively. Consequently, a circuit is then completed from the line L1 through the strip 301 to the wire 317 thence through the wire 318 to the solenoid 252, the circuit being completed through the wire 319, conductive strip 303 and wire 315 to the line L2. Therefore, the solenoid 252 is energized so that fluid pressure is supplied through the valve 246 to the cylinders 70, 72 behind the pistons therein for moving the pins or latching members 65, 66 into locking engagement with the upper leg of the hook. The fluid under pressure is delivered for this purpose by the motor 239 driving the pump 236, the motor being energized through the controller 300 by virtue of the wires 316 and 321 which provide circuits extending from the line L1 through the motor armature and fields to the wires 316, 321 which are now connected to the line L2, it being remembered that the strip 302 is now in bridging engagement with contacts 311, 312. The mercury switch MLS is provided upon the hook, preferably on the upper leg 54, and positioned so that the circuit therethrough is closed only when the hook is in a substantially vertical position. This prevents improper actuation of the latch pins or members 65, 66.

Movement of the controller 300 in the reverse direction places the conductive strips 304, 305 and 306 in bridging engagement with the contacts 307, 308 and 310, 311 and 312, 313, respectively. As before, the motor 239 for driving the pump 236 is energized through the wires 316, 321, it being remembered that contacts 312, 313 are now bridged by the strip 306. Simultaneously, a circuit is provided from the line L1 through the conductive strip 304 to the wire 317 thence through the switch MLS and wire 318 to the solenoid 253, the circuit being completed therefrom through the wire 320 and conductive strip 305 to the power supply line L2. Consequently, solenoid 253 is energized operating the valve 246 to supply fluid under pressure to the cylinders 70 and 72 in advance of the pistons 69, 71 thereof so that the latching pins or members 65, 66 are moved from engagement with the upper member of the hook, thereby permitting swinging or pivoting movement of the two legs of the hook relative to each other.

As mentioned heretofore, the material handling apparatus is provided with a cab 45 for the operator, in which cab are positioned the various controls to operate the apparatus, including the drum controllers 97, 98 for the hoist motors, the controller 276 for expanding and contracting the leg 53 of the hook, and the controller 300 for operating the latching or locking pins. Since the motor 239 and the solenoids 247, 248, 252 and 253 are carried by the hook and hence move relative to the cab 45, the various wires interconnecting the motor and the solenoids with the controllers 276 and 300 take the form of a multi-conductor cable 322 which is wound upon a take-up drum or reel 323 rotatably supported upon the frame 44 which supports the cab 45 and hook 46. The several conductors of the cable 322 provide the connections to the motors and solenoids carried by the hook, as schematically represented below the slip ring and brush assembly SR in Fig. 17 of the drawings, the various rings of which are provided on the axis for the reel 323.

The cab 45 is likewise provided with a drum type controller 324 regulating the operation of the motor such as 39 for effecting travel of the carrier along the rail 34, this controller preferably being in an inverted position above the controller 97. A similar controller, not shown, is also provided in the cab and is employed for effecting movement of the rail or bridge 34 along the rails 28.

The cab 45 may also be provided with various auxiliary equipment useful in operation and which are conventionally supplied such as, for example, one or more searchlights 325.

For the purpose of explaining the operation of the device, let it be assumed that annular bodies, such as coils of wire C, are to be transported from positions in which their axes extend substantially horizontally, for example, from a freight car, to storage in piles within the warehouse W in which piles the axes of the coils extend substantially vertically. In effecting such an operation, the operator positioned in the cab 45 will manipulate the travel controller 324 to control energization of the carrier motor or motors 39 and thereby effect movement of the material handling mechanism along the rail 34. A similar controller, when manipulated, controls energization of suitable motors to effect movement of the rail or bridge 34 and the handling mechanism along the rails 28, these operations being similar to conventional overhead monorail crane movements and hence need not be described in detail.

When the material handling mechanism has thus been moved to a position above one end of a row of the coils C in a railroad car or the like, which coils are to be lifted and transported, the hoist controller 97 is actuated to thereby energize the main hoist motor 51 thus causing the hook 46 to move downwardly, while remaining substantially horizontal, due to the simultaneous paying off of the cable 47 from both ends of the drum 49 and a corresponding paying off of the cable 48 from the central portion of the drum 49. This lowering of the hook is continued until the leg 53 thereof is at substantially the same elevation as the axes of the coils to be handled and substantially aligned therewith. If the axes of the coils be not substantially horizontal, the forward end of the hook may be tilted, either upwardly or downwardly as may be necessary, by energization of the auxiliary hoist motor 52, through actuation of the controller 98, so that the cable 48 is paid out or taken up independently of the cable 47. When alignment has been secured, the hook 46 is moved forwardly, by energization of the travel motor or motors 39, thus inserting the expansible leg 53 of the hook into the central openings of one or more of the coils.

After the leg 53 of the hook has been inserted within the coils, the hook is preferably raised slightly so as to cause the coils to be supported thereby and the handle 296 of the controller 276 is then actuated in a clockwise direction, as viewed in Fig. 17. This brings the movable conductive segments or strips 297, 298 and 299 into engagement with the stationary contacts 284, 286 and 282, 292 and 275, 281, respectively. Electrical energy is consequently supplied from L1 through the wire 285, contact 284, and conductive segment 297 to contact 286. Since the contact 286 is connected with the contact 287 and the latter is connected with the wire 288, current flows through this wire to one terminal of the solenoid 248 for the valve 245. The circuit is completed from the other terminal of the solenoid 248 through the wire 291, contact 292, and conductive portion 298 to the contact 282, which is connected with the power line L2. Since the contact 282 is also connected to the contact 281, engagement of the latter and the contact 275 by the conductive segment 299 establishes a circuit from L2 to the wire 274 and hence to one terminal of the circuit breaker 273. This latter circuit continues from the other side of the circuit breaker through the wires 272 and 271 to the series field coil 270 of the motor 239, and thence through the armature 266 of the motor and wires 268, 267 and 265 to the other power supply line L1. The shunt field winding 278 of the motor 239 is continuously energized, since it is directly connected across the lines L1 and L2, in parallel with the armature and series field winding of the motor, by wires 265, 267, 277, 279, 280 and 283.

The operation of the controller 276 has therefore energized the motor 239 so that the pump 236 effects withdrawal of liquid from the tank or reservoir 235 and forces the liquid under pressure to the pressure relief valve 241 and from the latter to the valve 245. Since the solenoid 248 has been energized, the liquid under pressure is supplied through the valve 245 to the conduit 249 and thence to the valve 257 from which the liquid flows through the conduit 258 and conduits 188, 202 to the cylinders 170 and 199. These cylinders are drained, in advance of their pistons, through the conduits 189 and 203 which are connected to the conduit 264 and thence to the counterbalance valve 263, the valve 245 providing a drain or exhaust passage therethrough intercommunicating the conduits 250 and 251.

The liquid under pressure thus supplied to the cylinders 170 and 199 moves the piston rods 173 and 198 outwardly, excessive rate of this movement, due to action of gravity on plate 167 and the attached parts, being prevented by the adjustment of the counterbalance valve 263 which regulates the rate of drainage or exhaust of fluid pressure from in advance of the pistons in the cylinders to substantially the same rate as that at which fluid under pressure is supplied behind the pistons by the action of pump 236. As the piston rods thus move outwardly, they operate through the linkages connected therewith to move the plate 167 of leg 53 laterally with respect to the portion 164 until these parts are in firm engagement with opposite portions of the central openings in the coils C or other annular bodies supported on the expanding leg 53. At this time the links 181, 182 and 204, 205 occupy the inclined positions represented in one of the sets of broken line representations in Fig. 6, the particular set depending upon the corresponding position of the plate 167 as determined by the internal diameter of the coils or annular bodies on the hook.

When the two parts of the leg 53 are thus positioned, the resistance to further lateral movement of plate 167 tends to cause the pressure of the liquid in the system to increase, thereby causing the sequence valve 257 to direct fluid under pressure to the conduit 259 and hence to the finger operating cylinders 216, 217. This increased pressure also produces a somewhat further movement of the piston rods 173, 198 of the actuators or cylinders 170, 199. The application of fluid pressure to the cylinders 216, 217 through the conduits 220, 222 connected with the conduit 259, moves the finger members 212, 213 thus causing the projections 214 thereon to extend outwardly relative to the upper surface of the portion 164 of the leg 53, it being noted that the cylinders 216, 217 in advance of their pistons 218, 219 are connected to exhaust at this time through the counterbalance valve 263. The additional movement of the piston rods 173 and 198 does not produce any further lateral movement of the plate 167, but instead imparts a slight longitudinal movement thereto. This disposes the links 181, 182, 204 and 205 in the substantially horizontal positions indicated in the lower of either of the two broken line positions represented in Fig. 6, thereby causing the finger-like projections 210 on the levers 204, 205 to extend outwardly and transversely with respect to the plate 167. Therefore, the coils C in which the leg 53 of the hook is engaged are not only held by the force exerted at diametrically opposed points on the side walls of the central openings of the latter, but are also prevented from slipping over the free end of the hook in any tilted position of the latter by the fingers 210, 214, the extent of movement of these fingers being such that the distance from tip to tip, when in their outer positions, is considerably greater than the maximum internal diameter of the coils. It should be noted that the pressure exerted upon coils such as C, due to expansion of the hook, is substantially the same regardless of the internal diameters of the coils since the pressure applied to the cylinders 170 and 199 is substantially constant due to the operation of the pressure relief valve 241.

With the coils supported upon the expanded hook, the latter may be raised by operation of the hoist controllers 97, 98, and the handling apparatus with the coils thereon transported, to a point where storage is to be effected, by operation of the controllers regulating energization of the motors for moving the carrier along the rail or bridge 34 and for movement of the latter along the runway or rails 28. During this movement the hook 46 is preferably positioned in its uppermost location and the coils are held thereon substantially as shown at the left of Fig. 1. When the hook 46 is thus moved to a position above the space between sets of vertically extending members 25, defining one of the storage piles, it is tilted to bring the leg 53 thereof substantially vertical by operation of the controller 98 regulating energization of the auxiliary hoist motor 52, thereby lowering the forward end of the hook, and/or by energization of the controller 97 regulating the hoist motor 51, thereby raising the rear end of the hook.

When the hook 46 has been moved so as to bring the axis of the coils C and the leg 53 substantially vertical, the controller 300 is operated in a clockwise direction energizing the solenoid 253, so that the conductive segments 304, 305 and 306 are in bridging relationship with their cooperating stationary contacts 307, 308 and 310, 311 and 312, 313, respectively. Hence, the solenoid 253 and the motor 239 are energized as has been previously described. Therefore, fluid under pressure is now supplied through the conduit 244 and valve 246 to the conduit 255 supplying the fluid under pressure in advance of the pistons 69 and 71. This retracts the latching pins or members 65, 66 so that the upper leg or portion of the hook can now be pivoted or swung relative to the lower leg 53. The operator then actuates the controller 98, thereby energizing the motor 52 in a direction which causes elevation of the upper leg 54 of the hook, this operation continuing until the two legs are disposed with respect to each other substantially as shown in the lowermost dotted position in Fig. 4 so that the upper leg and lower leg are approximately in alignment.

The main hoist motor 51 is then energized through operation of the controller 97 in a direction which effects paying off of the cables 47 and 48 thereby lowering the hook 46 and the coils C to the position substantially as shown in broken lines at the right-hand side of Fig. 1 wherein it will be seen that the hook enters the space between the vertical supports 25 defining one of the vertical storage piles.

With the hook and coils in the positions just mentioned the controller 276 is operated in a counterclockwise direction to move the conductive segments 293, 294 and 295 into engagement with the cooperating stationary contacts. This operation of the circuit controller 276 completes a circuit from power line L1 through the wire 285 to contact 284, thence through conductive portion 293 to contact 287, the circuit continuing through the wire 288 to one terminal of the solenoid 247 of valve 245. The circuit is completed from the other terminal of the solenoid 247 through the wire 289, contact 290 and conductive segment 295 to contact 281 and hence to the line L2, since the contact 281 is bridged with the contact 282 and the latter is, in turn, connected with the power line L2. A circuit is also completed from the line L2 and contact 282 through the conductive segment 294 to the contact 275 and thence through the circuit breaker 273 to the series field winding 270, the circuit continuing through the armature 266 of the motor 239 and wire 265 to the line L1. The shunt field winding 278 remains energized since it is continuously connected with the lines L1 and L2 as previously described. It is evident, therefore that the motor is energized for rotation in the same direction regardless of the direction of movement of the controller 276 but the direction of movement of the said controller determines which of the solenoids 247, 248 is energized.

The energization of the solenoid 247 now moves the valve 245 so that the liquid under pressure, supplied by the pump 236, is transmitted to the pipe or conduit 250 and thence through the counterbalance valve 263 and conduit 264 to the conduits 189, 203, 221 and 223 connected with the several hydraulic actuators or cylinders 170, 199, 216 and 217, respectively. At this time the conduits 188, 202, 220 and 222 of these several actuators or cylinders are connected to drain or exhaust to the sump or reservoir 235 through the conduits 258, 259, valve 257, conduit 249, and valve 245, which provides a passageway therethrough communicating with the conduit 251 leading to the sump or reservoir 235. It will be apparent, therefore, that the several pistons within the cylinder are now moved in the reverse direction to that previously described thereby withdrawing the finger-like projections 210 and 214 inwardly of the expanding leg 53 of the hook, and returning the plate 167 to its initial or unexpanded position so that the leg may now be freely withdrawn from the central openings of the coils C, leaving the latter in place in a vertical pile.

The controller 97 may then be operated in the reverse direction, thus energizing the motor 51 for taking up the cables 47, 48 thereby elevating the hook until it clears the supporting piles or posts 25. The controller 98 is then operated in a direction energizing the motor 52 for paying off the cable 48 so that the upper leg 54 of the hook moves downwardly into substantially parallel relationship with the lower leg 53 and until the plates 58, 59 strike the adjusting screws 78, 79. At this time the openings 73 in the plates 58, 59 of the upper leg are then aligned with the latching pins 65, 66 carried by the lower leg and the switch MLS is closed. Hence, operation of the motor 52 is then terminated and the controller 300 is operated in a direction energizing the solenoid 252, that is, by moving the conductive portions 301, 302, 303 into bridging engagement with the stationary contacts 308, 309 and 311, 312 and 313, 314. Consequently, the valve 246 is now energized in a direction permitting the supplying of fluid under pressure from the conduit 244 to the conduit 254 at the backs of the cylinders 70 and 72, it being remembered that the motor 239 is also energized for operating the fluid pressure pump. Therefore, the latching pins 65, 66 are projected outwardly into engagement in the openings 73 of the upper leg 54 so that the two legs 53, 54 of the hook are again connected together in the substantially U-shape configuration.

The hook 46 with the two legs again connected together as just described may then be raised or tilted as may be necessary or desired through operation of the controllers 97 and 98, as will now be apparent. In the event the operator inadvertently raises the hook excessively before moving the upper and lower legs into their U-shaped configuration, the cable 48 will have such an angularity with respect to the vertical as to engage the pivoted plate 163, thus operating the limit switches 1LS2 and 2LS2 terminating the energization of that motor or motors 51, 52, whichever is then energized. The hook may then be lowered through reverse rotation of the corresponding controllers 97 or 98 as has been previously explained. Likewise, inadvertent excessive elevation of the rear portion of the hook will operate the limit switches 1LS3 and 2LC3 terminating the operation of the hoist motors 51 and/or 52. As before, operation of the controllers 97 and 98 in the opposite direction effects lowering of the hook. Similarly, excessive elevation of the forward portion of the hook 46 when the latter is in elevated position will operate limit switches 1LS1 and 2LS1 terminating the energization of motors 51 and 52, reverse rotation of the controllers providing for release of the brakes for effecting lowering of the hook. Also, excessive tilting of the hook in either direction while in mid-air will actuate switch SLS terminating energization of motor 52.

In the operation of the device as just described, the drum controller 276 need not be left in one actuated position thereof so as to maintain the motor 239 in continuous operation for supplying liquid under pressure when the hook is in expanded position. This is due to the fact that the valve 245 is of the double-acting type, spring centered, and in neutral or central position connects the conduit 243 to the conduit 251 while blocking the conduits 249 and 250 from communication with either the conduit 243 or 251. Consequently, when the solenoid 248 has been energized to effect expansion of the hook and this expanding operation has been completed, the controller 276 may be returned to neutral position, that is, to the position as indicated in Fig. 17, at which time the motor 239 and the solenoid 248 will be deenergized. The valve 245 will return to its neutral or central position and the fluid pressure will be maintained within the cylinders. Likewise, the drum controller 300 need not be left in an actuated position since the latching or locking pins 65, 66 remain in position to which they have been operated until fluid pressure is supplied on the opposite side of the associated pistons to move the pins to their other position.

Material in storage, as represented by the vertical piles between the upright members 25, may be readily removed therefrom by similar operations of the material handling apparatus. That is to say, the apparatus is moved to a position over the pile of coils from which removal is to be effected. The hook 46 is then tilted to bring its leg 53 to a substantially vertical position and the upper leg is unlatched from the lower leg and swung upwardly with respect thereto. The hook is then lowered with the leg 53 in its contracted condition so that it enters the central openings of the coils C. When thus positioned, the leg 53 of the hook is expanded, as before described, and the finger-like projections 210, 214 are moved outwardly with respect thereto. The coils C will thus be firmly held upon the expanded leg 53 of the hook and the latter may then be elevated, moved to a place where the coils are desired, and then lowered, the coils either being disposed in vertical arrangement or the hook manipulated to horizontal position as desired. After the coils have come to rest upon a supporting surface, the leg 53 of the hook may then be contracted and removed from the coils. In the event it should be desired to dispose the coils in a liquid bath without lowering the hook therein, the contraction of the hook may be effected before the coils come to rest upon a supporting surface so that the coils drop from the hook.

When removing the coils from storage, the engagement of the finger-like projections 210, 214 beyond the outer face of the lowermost coil in the pile is facilitated by having the piles so supported that the end of the leg 53 can project therebelow. This may be effected by supporting the coils C upon horizontally extending members, such as 26, spaced above the floor of the warehouse W, by providing wells of sufficient depth in the floor of the warehouse in alignment with the central openings of the piles of coils, or by any other expedients.

The above-detailed descriptions of the present preferred form of an apparatus for handling coiled material or other annular bodies represents an example of the manner in which the invention may be practically applied. It will be understood, however, that numerous modifications may be made in such an apparatus by one skilled in the art after having had the advantages of this disclosure. For example, the hook may be supported from, and moved by, conventional means other than a crane or transfer bridge mechanism. Furthermore, while the expansion of leg 53 of the hook has been disclosed as hydraulically effected, it may also be operated mechanically by electrical motors as described in my above mentioned copending application S. N. 81,696. Moreover, the invention, while especially useful in handling and storing coiled material, such as wire, rod, or strip metal, is not limited thereto but may be employed to handle and store other annular bodies, such as gear blanks, tile, or the like. Therefore the invention is not to be considered as limited to the specific construction described and illustrated except as required by the spirit and scope of the appended claims.

Having thus described my invention, I claim:

1. A material handling apparatus comprising a member including two spaced legs one of which is adapted to be inserted in an opening of the bodies to be handled while the other extends externally of said bodies, means pivoting said legs for relative angular swinging movement, means latching said legs when they are in spaced substantially parallel relationship, means for releasing said latching means, means supporting said member for overhead movement, means for horizontally moving said member to various desired positions relative to said supporting means, means for raising and lowering said member and for swinging said other leg of said member angularly relative to the said one leg when said latching means is moved to released position, the said one leg of said member comprising substantially parallel extending interconnected parts, and means to produce relative transverse movement between said parts selectively towards and away from each other whereby the said parts may be disposed closely adjacent each other for insertion in the openings of bodies to be handled and thereafter laterally moved to effect engagement of the said parts with spaced portions of said openings in the said bodies to grip the latter and prevent displacement thereof relative to said member when the latter is moved to various positions.

2. A material handling apparatus as defined in claim 1 and further comprising movable finger-like members mounted on said one leg adjacent the free end thereof, and means to move said finger-like members relative to said one leg to positions extending substantially transversely outwardly therefrom.

3. A material handling apparatus as defined in claim 1 and further comprising operator actuated control means carried by said supporting means and operatively connected to control the said relative transverse movement between the parts of said one member, and operator actuated control means carried by said supporting means and operatively connected to control the operation of the said latching means.

4. In a material handling apparatus of the type having an overhead substantially horizontally extending support with a carrier means movable along said support and provided with a plurality of cables depending therefrom to which one leg of a material engaging member comprising a pair of spaced legs is attached for support and manipulation, the improvement comprising means pivoting the legs of said member adjacent one end thereof for relative swinging movement, means latching said legs together when they are in spaced substantially parallel relationship, one of the legs of said members comprising substantially parallel extending interconnected parts adapted to be inserted in central openings of bodies to be handled while the said leg to which the cables are attached extends externally of said bodies, means carried by said member for producing relative movement of said parts selectively towards and away from each other whereby the said parts may be disposed closely adjacent to each other for insertion in the opening through a body or bodies to be handled and thereafter moved apart to effect engagement of the said parts with spaced portions of said openings in the said bodies to grip the latter, means for releasing said latching means to thereby permit said legs to move relative to each other from said substantially parallel relationship to a position in which said legs are approximately in alignment, means to prevent release of said latching means except when said legs are disposed substantially vertically, and means to prevent excessive elevation of said member when said legs are disposed in approximate alignment.

5. A material handling apparatus comprising a pair of elongated memebrs with one of said members having a free end adapted to be inserted in an opening of the body to be handled while the other of said members extends externally of the body, means pivoting said members together adjacent only one end of each, latching means carried by one of said members and engageable with other of said members when the two members are in spaced substantial parallel relationship thereby latching the said members in such relationship, means for moving said latching means to a position releasing said members for relative swinging movement about said pivoting means and out of said parallel relationship, operator actuated means controlling the operation of said latching means at a point remote from the latter, means to adjust the positions of said members relative to each other when they are unlatched but disposed substantially parallel to enable operation of said latching means to a position securing the same members together, means on the first-mentioned member engaging a body supported thereon for preventing displacement of said body therefrom, and means connected with said other member for effecting raising and lowering thereof.

6. In an overhead material handling system, a supporting member supported for overhead movement, a material manipulating device including a first member and a second member having a free end adapted to be received by an opening in the body to be handled, pivot means on said device mounting said first member for relative pivotal movement with respect to said second member, releasable latching means for latching said first and second members in spaced substantially parallel relationship with said first member extending toward the free end of said second member, means suspending said device from said supporting member and for raising and lowering said device including tackle means connected to said supporting member and to the end portion of said first member adjacent the free end of said second member for swinging said first member about said pivot means when said latching means is released and for tilting the manipulating device and for supporting the manipulating device in an angular position with respect to the vertical when said latching means is latched, power actuated means on said supporting member for taking in and letting out said tackle means, and means for preventing the operation of said latching means to a released position unless said first and second members are in a substantially vertical position.

7. In a material handling apparatus for handling bodies with openings therein, a member including a first leg and a second leg having a free end adapted to be received by an opening in the body to be handled, pivot means on said member pivotally mounting said first leg for movement to a position generally parallel to said second leg and extending toward the free end thereof from said pivot means, releasable means for locking said first leg and preventing relative movement between said second leg and said first leg when the latter is in said position, means for holding the body to be handled on said second leg, overhead means for raising and lowering said member and for angularly moving said member in a vertical plane comprising first tackle means connected to said first leg at a point thereon between the end thereof adjacent the free end of said second leg and its pivotal connection to the member and second tackle means connected to said member on the opposite side of the pivot connection from said first tackle means at a point where said second leg lies in a substantially vertical position when said member is supported solely by said second tackle means, and means for preventing the operation of said latching means to a released position unless said second leg is in a substantially vertical position.

8. A material handling apparatus comprising a substantially U-shaped member one leg of which is adapted to be inserted into an opening of the body to be handled while the other leg extends exteriorly of the body, means pivoting said legs adjacent the connected ends thereof for swinging movement relative to the other, means for moving said latching means to a position releasing said legs for relative swinging movement about said pivoting means, means on said one leg for preventing displacement of a body being handled from said leg, power actuated means for raising and lowering said member including means connected with the other of said legs for supporting the free ends of said legs when said legs are substantially horizontal and for effecting raising and lowering of the free end of the said other of said legs about said means pivoting said legs when said one leg is in a substantially vertical position, and means responsive to the angularity of said legs to prevent actuation of said latching means to a released position except when the said legs are both disposed substantially vertically.

9. A material handling apparatus comprising a substantially U-shaped member one leg of which is adapted to be inserted into an opening of the body to be handled while the other leg extends exteriorly of the body, means pivoting said legs adjacent the connected ends thereof for swinging movement relative to the other, means for moving said latching means to a position releasing said legs for relative swinging movement about said pivoting means, power actuated means for raising and lowering said member including means connected with the other of said legs for supporting the free ends of said legs when said legs are substantially horizontal and for effecting raising and lowering of the free end of the said other of said legs about said means pivoting said legs when said one leg is in a substantially vertical position, and means responsive to the angularity of said legs to prevent actuation of said latching means to a released position except when the said legs are both disposed substantially vertically.

References Cited in the file of this patent

UNITED STATES PATENTS

| | | |
|---|---|---|
| 220,300 | Morgan | Oct. 7, 1879 |
| 898,733 | Fiske | Sept. 15, 1908 |
| 992,307 | Weickel et al. | May 16, 1911 |
| 1,320,403 | Mertian | Nov. 4, 1919 |
| 1,334,892 | Dickinson | Mar. 23, 1920 |
| 1,493,953 | Bolgiano | May 13, 1924 |
| 1,546,364 | Bennington | July 21, 1925 |
| 1,605,273 | Norton et al. | Nov. 2, 1926 |
| 1,674,100 | Fitch | June 19, 1928 |
| 1,694,084 | Straight | Dec. 4, 1928 |
| 1,762,796 | Ridenour | June 10, 1930 |
| 1,764,481 | Watkins | June 17, 1930 |
| 1,868,562 | Chubb et al. | July 26, 1932 |
| 2,082,393 | Hallenbeck | June 1, 1937 |
| 2,113,712 | Robinson | Apr. 12, 1938 |
| 2,207,648 | Wick | July 9, 1940 |
| 2,624,470 | Geist | Jan. 6, 1953 |
| 2,630,931 | Douglas | Mar. 10, 1953 |
| 2,696,920 | Anjesky | Dec. 14, 1954 |